US012775378B2

(12) United States Patent
Li et al.

(10) Patent No.: US 12,775,378 B2
(45) Date of Patent: Oct. 27, 2026

(54) MEMORY ACCESS BASED ON VIRTUAL ADDRESS COMMUNICATION

(71) Applicant: Huawei Technologies Co., Ltd., Shenzhen (CN)

(72) Inventors: Bojie Li, Shenzhen (CN); Amit Geron, Hod Hasharon (IL); Shamir Rabinovitch, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/956,425

(22) Filed: Nov. 22, 2024

(65) Prior Publication Data

US 2025/0085853 A1 Mar. 13, 2025

Related U.S. Application Data

(63) Continuation of application No. PCT/CN2023/095220, filed on May 19, 2023.

(30) Foreign Application Priority Data

May 26, 2022 (CN) ......................... 202210587433.6

(51) Int. Cl.
*G06F 3/06* (2006.01)
*G06F 12/02* (2006.01)

(52) U.S. Cl.
CPC .......... *G06F 3/0608* (2013.01); *G06F 3/0659* (2013.01); *G06F 3/0673* (2013.01); *G06F 12/023* (2013.01)

(58) Field of Classification Search
CPC .... G06F 12/023; G06F 12/08; G06F 12/1009; G06F 12/1036; G06F 12/1081; G06F 2209/548; G06F 2212/657; G06F 3/0608; G06F 3/0659; G06F 3/0673; G06F 9/544; G06F 9/546
See application file for complete search history.

(56) References Cited

U.S. PATENT DOCUMENTS 9,037,753 B2 5/2015 Guerin et al.
10,114,758 B2 10/2018 Duncan et al.
(Continued)

FOREIGN PATENT DOCUMENTS

CN 105589506 A 5/2016
CN 110045912 A 7/2019
(Continued)

OTHER PUBLICATIONS

Aniruddha G. Shet et al., Characterization of Computation-Communication Overlap in Message-Passing Systems, Feb. 14, 2008, total 22 pages.

*Primary Examiner* — Jane W Benner
(74) *Attorney, Agent, or Firm* — Conley Rose, P.C.

(57) ABSTRACT

In a memory access method, a receiver receives a memory access message from a sender in advance, determines an address of the receiver that is used to access a memory of the sender, and determines a mapping relationship between a virtual address and a corresponding physical address. Thus, provided the address of the receiver that is used to access a memory of the sender is registered with a memory region, the receiver may access a memory of the sender.

20 Claims, 14 Drawing Sheets

(56) References Cited

U.S. PATENT DOCUMENTS

| | | | | |
|---|---|---|---|---|
| 2010/0232448 | A1* | 9/2010 | Sugumar | G06F 15/17337 370/412 |
| 2012/0233248 | A1* | 9/2012 | Zou | H04L 67/56 709/203 |
| 2014/0214998 | A1* | 7/2014 | Lentini | H04L 47/70 709/212 |
| 2015/0220481 | A1* | 8/2015 | Tanimoto | G06F 12/1081 711/170 |
| 2016/0294983 | A1* | 10/2016 | Kliteynik | G06F 15/17331 |
| 2019/0243552 | A1* | 8/2019 | Maharana | G06F 12/1081 |
| 2019/0324917 | A1 | 10/2019 | Cui et al. | |
| 2020/0348851 | A1 | 11/2020 | Grosman et al. | |

FOREIGN PATENT DOCUMENTS

| | | | | |
|---|---|---|---|---|
| CN | 110392084 | A | 10/2019 | |
| WO | WO-2016101288 | A1 * | 6/2016 | G06F 12/0292 |
| WO | 2020001459 | A1 | 1/2020 | |
| WO | 2020236271 | A1 | 11/2020 | |
| WO | 2021239228 | A1 | 12/2021 | |

* cited by examiner

MEMORY ACCESS BASED ON VIRTUAL ADDRESS COMMUNICATION

CROSS-REFERENCE TO RELATED APPLICATIONS

This is a continuation of Int'l Patent App. No. PCT/CN2023/095220, filed on May 19, 2023, which claims priority to Chinese Patent App. No. 202210587433.6, filed on May 26, 2022, both of which are incorporated by reference.

FIELD

Embodiments relate to the communication field, and in particular, to a memory access method and a related device.

BACKGROUND

In a data center network, remote memory access may be performed between servers, that is, remote exchange of memory data is implemented by using network interface cards of the servers.

In an existing remote memory access technology, for example, remote direct memory access (RDMA), a server first allocates a memory region in its memory, and then registers memory data corresponding to a virtual address with the memory region. The memory data in the memory region is a physical address. This implements pinning of a mapping relationship between the virtual address and the physical address of the memory data (referred to as memory pinning). Consequently, a network interface card may directly access the memory via a corresponding physical address obtained through virtual address mapping.

However, it takes long time to register excessive memory data with the memory region, which causes slow initialization of an application program of the server. In addition, registered memory data may not be used in a subsequent access process, and consequently, memory space is occupied by the idle memory data.

SUMMARY

Embodiments provide a memory access method and a related device, to avoid slow initialization of an application program, and prevent memory space from being occupied by idle memory data during memory access. Embodiments further provide a corresponding server, a computer-readable storage medium, a chip system, and the like.

According to a first aspect, a memory access method includes: A receiver receives a memory access message from a sender. The memory access message includes a sender virtual address and a receiver virtual address, and a mapping relationship between the sender virtual address and a corresponding sender physical address is determined. The receiver determines a mapping relationship between the receiver virtual address and a corresponding receiver physical address, and accesses a memory of the sender based on the sender physical address and the receiver physical address.

In the first aspect, the receiver receives the memory access message from the sender in advance, determines the address of the receiver that is used to access a memory of the sender, and determines the mapping relationship between the virtual address and the corresponding physical address. In other words, provided that the address of the receiver that is used to access a memory of the sender is registered with a memory region, the receiver may access the memory of the sender. This prevents the receiver from registering all virtual addresses with the memory region, accelerates initialization of an application program of a server, and prevents memory space from being occupied by idle memory data.

In a possible implementation of the first aspect, the step in which the receiver accesses the memory of the sender based on the sender physical address and the receiver physical address includes: The receiver fetches, based on the sender physical address and the receiver physical address, access data corresponding to the sender virtual address into the receiver virtual address.

In this possible implementation, when an access type is a write operation or a send operation, the receiver specifically fetches the access data corresponding to the sender virtual address into the receiver virtual address, to improve implementability of the solution.

In a possible implementation of the first aspect, after the step in which the receiver receives the memory access message from the sender, the method further includes: When the receiver virtual address is in a page fault state and the access data is an entire page, the receiver allocates a new page in a memory for writing the access data.

In this possible implementation, when the receiver virtual address is in the page fault state (the page fault means that the page is swapped out and needs to be swapped in), and the access data is the entire page, the receiver allocates the new page for writing the access data during page fault handling, and directly discards the page, in a slow storage medium of the receiver, that needs to be swapped in, to avoid swap-in overheads.

In a possible implementation of the first aspect, the step in which the receiver accesses the memory of the sender based on the sender physical address and the receiver physical address includes: The receiver writes, based on the sender physical address and the receiver physical address, access data corresponding to the receiver virtual address into the sender virtual address.

In this possible implementation, when an access type is a read operation, the receiver specifically writes the access data corresponding to the receiver virtual address into the sender virtual address, to improve implementability of the solution.

In a possible implementation of the first aspect, after the step in which the receiver accesses the memory of the sender based on the sender physical address and the receiver physical address, the method further includes: The receiver unbinds the mapping relationship between the receiver virtual address and the corresponding receiver physical address, and sends an access complete message to the sender, so that the sender unbinds the mapping relationship between the sender virtual address and the corresponding sender physical address.

In this possible implementation, after current memory access is completed, because both memories are temporarily pinned to the sender and the receiver, the sender virtual address and the receiver virtual address may not continue to be used for next memory access. Therefore, the receiver further needs to unpin the receiver virtual address from the corresponding receiver physical address, and send the access complete message to the sender, to notify the sender that the current memory access is completed. After receiving the access complete message, the sender unpins the sender virtual address from the corresponding sender physical address based on the access complete message. This improves implementability of the solution.

In a possible implementation of the first aspect, a data size of the access data corresponding to the sender virtual address or a data size of the access data corresponding to the receiver virtual address is greater than a preset threshold.

In this possible implementation, the data size of the access data is greater than the preset threshold. Therefore, the access data is more applicable to the solution, to avoid copy overheads, and improve implementability of the solution.

According to a second aspect, a memory access method includes: A sender obtains a memory access message. The memory access message includes a sender virtual address and a receiver virtual address. The sender determines a mapping relationship between the sender virtual address and a corresponding sender physical address, and sends the memory access message to a receiver, so that the receiver determines a mapping relationship between the receiver virtual address and a corresponding receiver physical address, and accesses a memory of the sender based on the sender physical address and the receiver physical address.

In a possible implementation of the second aspect, the receiver is further configured to fetch access data corresponding to the sender virtual address into the receiver virtual address.

In a possible implementation of the second aspect, when the receiver virtual address is in a page fault state and the access data is an entire page, the receiver is further configured to allocate a new page in a memory for writing the access data.

In a possible implementation of the second aspect, the receiver is further configured to write access data corresponding to the receiver virtual address into the sender virtual address.

In a possible implementation of the second aspect, after the step in which the sender sends the memory access message to the receiver, the method further includes: The sender receives an access complete message sent by the receiver; and unbinds the mapping relationship between the sender virtual address and the corresponding sender physical address based on the access complete message.

In a possible implementation of the second aspect, the step in which the sender determines the mapping relationship between the sender virtual address and the corresponding sender physical address includes: The sender determines whether a data size of the access data corresponding to the sender virtual address or a data size of the access data corresponding to the receiver virtual address is greater than a preset threshold; and if yes, determines the mapping relationship between the sender virtual address and the corresponding sender physical address.

The second aspect or any one of the possible implementations of the second aspect corresponds to the first aspect or any one of the possible implementations of the first aspect. The second aspect or any one of the possible implementations of the second aspect is specifically implemented based on descriptions of a peer end in the first aspect or any one of the possible implementations of the first aspect, and the specific implementation has same beneficial effect as that of the first aspect.

According to a third aspect, a memory access method includes: A receiver receives, via a receive buffer, a memory access message sent by a sender via a send buffer. The memory access message includes a receiver virtual address and access data, the access data is obtained by copying, by the sender, data corresponding to a sender virtual address to the send buffer, a mapping relationship between a virtual address of the send buffer and a corresponding physical address is determined, a mapping relationship between a virtual address of the receive buffer and a corresponding physical address is determined, and the send buffer communicates with the receive buffer based on the physical address. The receiver copies the access data in the receive buffer to the receiver virtual address.

In the third aspect, when initiating a memory access request, the sender only needs to copy the access data to the send buffer of a pinned memory, and directly sends the access data to the receive buffer of a pinned memory in the receiver. This ensures that a network interface card uses pinned physical addresses, and reverse communication is not required. The receiver can access the memory of the sender, a subsequent memory access request is not blocked when there is a page fault, and overheads of reverse communication are reduced.

In a possible implementation of the third aspect, a data size of the access data corresponding to the sender virtual address is less than a preset threshold.

In this possible implementation, the data size of the access data is less than the preset threshold. Therefore, the access data is more applicable to the solution, and the access data with a small data size in the pinned memory does not occupy much memory space, to avoid slow initialization of an application program, prevent memory space from being occupied by idle memory data, and improve implementability of the solution.

According to a fourth aspect, a memory access method includes: A sender generates a memory access request. The memory access request includes a sender virtual address and a receiver virtual address. The sender copies access data corresponding to the sender virtual address to a send buffer of the sender. A mapping relationship between a virtual address of the send buffer and a corresponding physical address is determined. The sender sends a memory access message to a receive buffer of a receiver via the send buffer, so that the receiver copies access data in the receive buffer to the receiver virtual address. The memory access message includes the receiver virtual address and the access data, a mapping relationship between a virtual address of the receive buffer and a corresponding physical address is determined, and the send buffer communicates with the receive buffer based on the physical address.

In a possible implementation of the fourth aspect, the step in which the sender copies the access data corresponding to the sender virtual address to the send buffer of the sender includes: The sender determines whether a data size of the access data corresponding to the sender virtual address is greater than a preset threshold; and if no, copies the access data corresponding to the sender virtual address to the send buffer of the sender.

The fourth aspect or any one of the possible implementations of the fourth aspect corresponds to the third aspect or any one of the possible implementations of the third aspect. The fourth aspect or any one of the possible implementations of the fourth aspect is specifically implemented based on descriptions of a peer end in the third aspect or any one of the possible implementations of the third aspect, and has same beneficial effect.

According to a fifth aspect, a memory access method includes: A receiver receives a memory access request from a sender. The memory access request includes a sender virtual address and a receiver virtual address. The receiver copies access data corresponding to the receiver virtual address to a send buffer of the receiver. A mapping relationship between a virtual address of the send buffer and a corresponding physical address is determined. The receiver sends a memory access message to a receive buffer of the sender via the send buffer, so that the sender copies access data in the receive buffer to the sender virtual address. The memory access message includes the sender virtual address and the access data, a mapping relationship between a virtual address of the receive buffer and a corresponding physical address is determined, and the send buffer communicates with the receive buffer based on the physical address.

In the fifth aspect, when initiating the memory access request, the sender only needs to forward the memory access request to the receiver, and receives, via the receive buffer of a pinned memory, the access data sent by the receiver via the send buffer of a pinned memory. Reverse communication is not required. The receiver can access the memory of the sender, a subsequent memory access request is not blocked when there is a page fault, and overheads of reverse communication are reduced.

In a possible implementation of the fifth aspect, a data size of the access data corresponding to the receiver virtual address is less than a preset threshold.

In this possible implementation, the data size of the access data is less than the preset threshold. Therefore, the access data is more applicable to the solution, and the access data with a small data size in the pinned memory does not occupy much memory space, to avoid slow initialization of an application program, prevent memory space from being occupied by idle memory data, and improve implementability of the solution.

According to a sixth aspect, a memory access method includes: A sender generates a memory access request. The memory access request includes a sender virtual address and a receiver virtual address. The sender sends the memory access request to a receiver, so that the receiver copies access data corresponding to the receiver virtual address to a send buffer of the receiver. A mapping relationship between a virtual address of the send buffer and a corresponding physical address is determined. The sender receives, via a receive buffer, a memory access message sent by the receiver via the send buffer. The memory access message includes the sender virtual address and the access data, a mapping relationship between a virtual address of the receive buffer and a corresponding physical address is determined, and the send buffer communicates with the receive buffer based on the physical address. The sender copies the access data in the receive buffer to the sender virtual address.

In a possible implementation of the sixth aspect, the step in which the sender sends the memory access request to the receiver includes: The sender determines whether a data size of the access data corresponding to the receiver virtual address is greater than a preset threshold; and if no, sends the memory access request to the receiver.

The sixth aspect or any one of the possible implementations of the sixth aspect corresponds to the fifth aspect or any one of the possible implementations of the fifth aspect. The sixth aspect or any one of the possible implementations of the sixth aspect is specifically implemented based on descriptions of a peer end in the fifth aspect or any one of the possible implementations of the fifth aspect, and has same beneficial effect.

According to a seventh aspect, a server is configured to perform the method in the first aspect or any one of the possible implementations of the first aspect. Specifically, the server includes a module or a unit, for example, a receiving unit, a pinning unit, and an access unit configured to perform the method in the first aspect or any one of the possible implementations of the first aspect.

According to an eighth aspect, a server is configured to perform the method in the second aspect or any one of the possible implementations of the second aspect. Specifically, the server includes a module or a unit, for example, an obtaining unit, a pinning unit, and a sending unit configured to perform the method in the second aspect or any one of the possible implementations of the second aspect.

According to a ninth aspect, a server is configured to perform the method in the third aspect or any one of the possible implementations of the third aspect. Specifically, the server includes a module or a unit, for example, a receiving unit and a copying unit configured to perform the method in the third aspect or any one of the possible implementations of the third aspect.

According to a tenth aspect, a server is configured to perform the method in the fourth aspect or any one of the possible implementations of the fourth aspect. Specifically, the server includes a module or a unit, for example, an obtaining unit, a copying unit, and a sending unit configured to perform the method in the fourth aspect or any one of the possible implementations of the fourth aspect.

According to an eleventh aspect, a server is configured to perform the method in the fifth aspect or any one of the possible implementations of the fifth aspect. Specifically, the server includes a module or a unit, for example, a receiving unit, a copying unit, and a sending unit configured to perform the method in the fifth aspect or any one of the possible implementations of the fifth aspect.

According to a twelfth aspect, a server is configured to perform the method in the sixth aspect or any one of the possible implementations of the sixth aspect. Specifically, the server includes a module or a unit, for example, an obtaining unit, a sending unit, a receiving unit, and a copying unit configured to perform the method in the sixth aspect or any one of the possible implementations of the sixth aspect.

According to a thirteenth aspect, a computer device includes a processor, a communication interface, and a storage, and the storage is configured to store program code. The processor is configured to invoke the program code in the storage, so that the processor performs the method in the first aspect or any one of the possible implementations of the first aspect, the method in the second aspect or any one of the possible implementations of the second aspect, the method in the third aspect or any one of the possible implementations of the third aspect, the method in the fourth aspect or any one of the possible implementations of the fourth aspect, the method in the fifth aspect or any one of the possible implementations of the fifth aspect, and the method in the sixth aspect or any one of the possible implementations of the sixth aspect.

According to a fourteenth aspect, a communication system includes a first server and a second server. The first server is configured to perform memory access on the second server, and the first server is configured to perform the method in the first aspect or any one of the possible implementations of the first aspect, the method in the third aspect or any one of the possible implementations of the third aspect, and the method in the fifth aspect or any one of the possible implementations of the fifth aspect. The second server is configured to perform the method in the second aspect or any one of the possible implementations of the second aspect, the method in the fourth aspect or any one of the possible implementations of the fourth aspect, and the method in the sixth aspect or any one of the possible implementations of the sixth aspect.

According to a fifteenth aspect, a computer-readable storage medium stores one or more computer-executable instructions. When the computer-executable instructions are executed by a processor, the processor performs the method in the first aspect or any one of the possible implementations of the first aspect, the method in the second aspect or any one of the possible implementations of the second aspect, the method in the third aspect or any one of the possible implementations of the third aspect, the method in the fourth aspect or any one of the possible implementations of the fourth aspect, the method in the fifth aspect or any one of the possible implementations of the fifth aspect, and the method in the sixth aspect or any one of the possible implementations of the sixth aspect.

According to a sixteenth aspect, a computer program product stores one or more computer-executable instructions. When the computer-executable instructions are executed by a processor, the processor performs the method in the first aspect or any one of the possible implementations of the first aspect, the method in the second aspect or any one of the possible implementations of the second aspect, the method in the third aspect or any one of the possible implementations of the third aspect, the method in the fourth aspect or any one of the possible implementations of the fourth aspect, the method in the fifth aspect or any one of the possible implementations of the fifth aspect, and the method in the sixth aspect or any one of the possible implementations of the sixth aspect.

According to a seventeenth aspect, a chip system includes at least one processor and an interface, and the interface is configured to receive data and/or a signal. The at least one processor is configured to support a computer device in implementing functions in the first aspect or any one of the possible implementations of the first aspect, functions in the second aspect or any one of the possible implementations of the second aspect, functions in the third aspect or any one of the possible implementations of the third aspect, functions in the fourth aspect or any one of the possible implementations of the fourth aspect, functions in the fifth aspect or any one of the possible implementations of the fifth aspect, and functions in the sixth aspect or any one of the possible implementations of the sixth aspect. In a possible design, the chip system may further include a storage. The storage is configured to store program instructions and data that may be necessary for the computer device. The chip system may include a chip, or may include a chip and another discrete device.

It can be learned from the foregoing technical solutions that embodiments have the following advantages:

When initiating a memory access request, the sender only pins, to a memory, a virtual address that needs to be accessed. When receiving a memory access message, the receiver only pins, to a memory, a virtual address that needs to be accessed, and further registers, with a memory region, memory data corresponding to the virtual address that needs to be accessed. Therefore, the receiver can access the memory of the sender to avoid slow initialization of an application program, and prevent memory space from being occupied by idle memory data.

DETAILED DESCRIPTION

Figure 1:
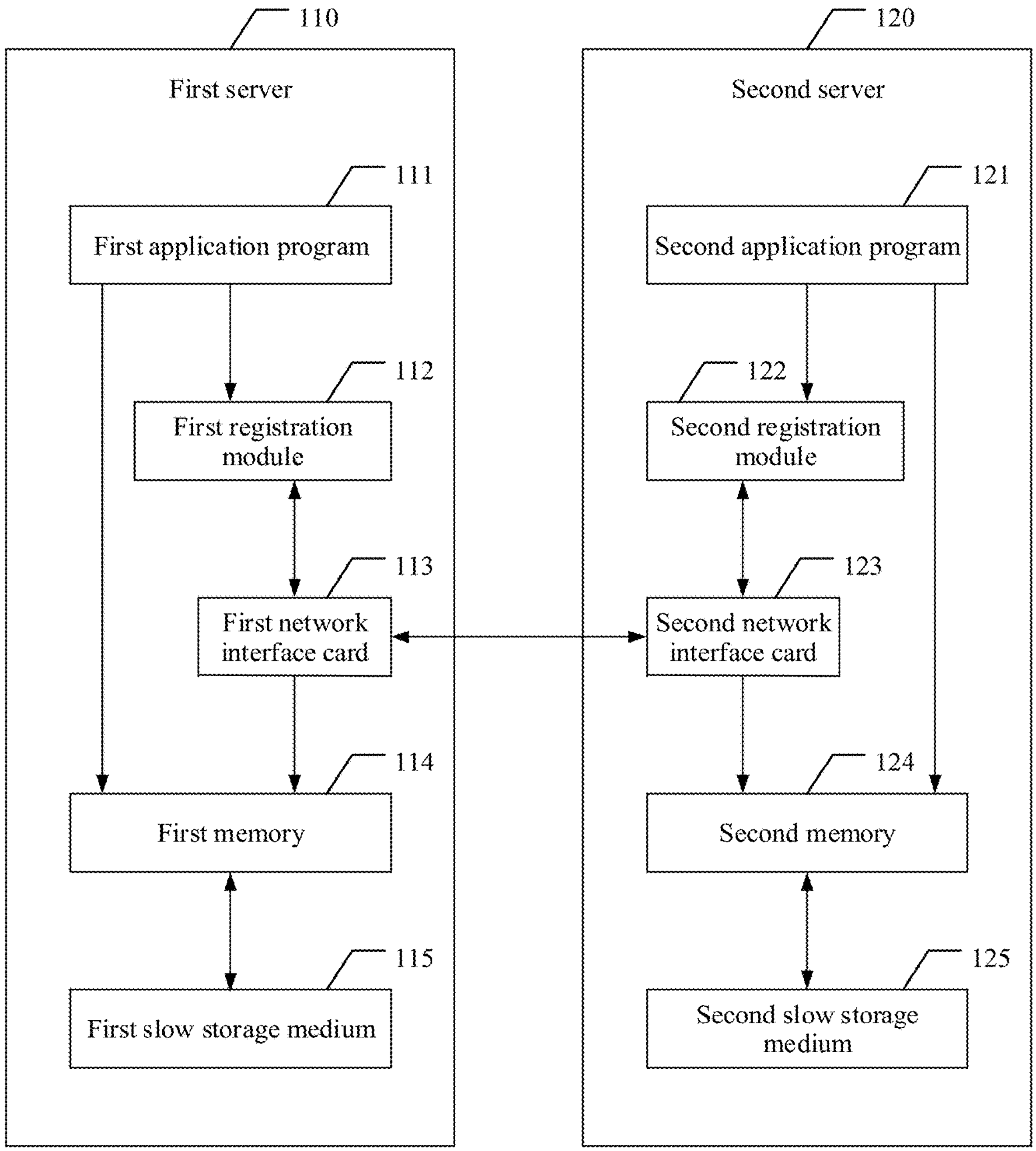
FIG. 1 is a diagram of an architecture of a scenario according to an embodiment.

The following describes embodiments with reference to accompanying drawings. It is clear that the described embodiments are merely some rather than all of embodiments. A person of ordinary skill in the art may know that with development of technologies and emergence of new scenarios, technical solutions provided in embodiments are also applicable to similar technical problems.

In the specification, claims, and accompanying drawings, terms "first", "second", and the like are intended to distinguish between similar objects but do not necessarily indicate a specific order or sequence. It should be understood that data termed in such a way is interchangeable in a proper circumstance, so that embodiments described herein can be implemented in other orders than the order illustrated or described herein. In addition, terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

The specific term "example" herein means "used as an example, embodiment, or illustration". Any embodiment described as "example" is not necessarily explained as being superior or preferred than other embodiments.

In addition, to better describe this disclosure, numerous specific details are given in the following specific implementations. A person skilled in the art should understand that this disclosure can also be implemented without some specific details. In some examples, methods, means, elements, and circuits that are well-known to a person skilled in the art are not described in detail, so that the subject of this disclosure is highlighted.

Embodiments provide a memory access method and a related device, to avoid slow initialization of an application program, and prevent memory space from being occupied by idle memory data during memory access. Embodiments further provide a corresponding server, a computer-readable storage medium, a chip system, and the like. The following provides descriptions in detail.

The following explains and describes some terms and concepts in embodiments.

(1) Physical memory: The physical memory is a memory that can be directly accessed by a central processing unit (CPU) via a load/store instruction, and is usually a double data rate (DDR) synchronous dynamic random access memory or a high bandwidth memory (HBM).

(2) Slow storage medium: The slow storage medium is a storage medium, for example, a solid-state disk (SSD) or a storage-class memory (SCM), that cannot be directly accessed by the CPU via the load/store instruction, and has lower costs per unit capacity than the physical memory.

(3) Virtual address: The virtual address is an address that a user sees through an application program.

(4) Physical address (which is also referred to as a real address): The physical address is an address of the physical memory.

(5) Page: The page is a basic unit for carrying data during virtual-physical address mapping in an operating system.

(6) Virtual-physical address mapping table: The virtual-physical address mapping table is a data structure that maps a virtual address to a physical address in a unit of each page. Usually (in an existing computer architecture), the CPU and a network interface card use different virtual-physical address mapping tables. The virtual-physical address mapping table of the CPU is maintained by the operating system, and the virtual-physical address mapping table of the network interface card is maintained by a network interface card driver. The virtual-physical address mapping table of the network interface card includes two levels (a level 2 is available in a virtualization scenario). A level 1 is a virtual-physical address mapping table (e.g., a memory translation table (MTT), of the network interface card, that is responsible for translating a virtual address into an input/output virtual address (IOVA). The operating system specifies that a 64-bit address of the IOVA is the same as a physical address. The level 2 is a mapping table inside the CPU, responsible for translating the IOVA into the physical address, for example, a mapping table of a memory virtualization unit (e.g., an input-output memory management unit (IOMMU)) in an X86 architecture and a mapping table of a memory virtualization unit (e.g., a system memory management unit (SMMU)) in an ARM architecture. Usually, the current network interface card driver uses only the level-1 virtual-physical address mapping table, but does not use the mapping table of the IOMMU/SMMU.

(7) Swap out: The operating system swaps a page that is not frequently used from the physical memory to the slow storage medium, to expand an available memory capacity.

(8) Swap in: If an application program needs to access a swapped-out page (that is, a virtual address of the page does not have a corresponding physical address), the application program can access the page only after the page is swapped in the physical memory from the slow storage medium.

(9) On-demand allocation: The on-demand allocation is a mechanism of the operating system. A corresponding physical address is not allocated when the application program does not access a virtual address, and is allocated when the application program accesses the virtual address for the first time.

(10) Memory pinning: A mapping relationship between a virtual address and a physical address is determined. Each virtual address has a corresponding physical address, and cannot be swapped out to the slow storage medium.

(11) Page fault: When an address in a memory that is not pinned is accessed, a virtual address does not have a corresponding physical address. There are four possible reasons: 1. Due to the on-demand allocation, a physical address is not allocated to the virtual address, and a new physical page needs to be allocated when the virtual address is accessed for the first time. 2. The physical page is swapped out, and a new page needs to be swapped in. 3. Because copy-on-write is set on the virtual page, and an access type of memory access is a write operation, a new page needs to be allocated and data is copied. 4. The accessed virtual address is an unauthorized address or does not have access permission, access is denied, for example, the server is maliciously attacked.

(12) Send buffer/Receive buffer: The send buffer/receive buffer is a region allocated from the memory. The region may be pinned to the memory, data is normally stored in a local buffer, and data that needs to be sent or received data may be copied to the send buffer or the receive buffer.

(13) RDMA: The remote direct memory access is a direct memory access technology that transmits data from a local memory to a remote device without participation of operating systems (OSs) of two parties.

(14) Memory region (MR): In the RDMA technology, the memory region needs to be registered before the network interface card directly accesses data in the memory.

(15) Queue pair (QP): Each QP includes a send queue (SQ) and a receive queue (RQ).

(16) Work queue (WQ): The work queue includes an SQ, an RQ, and a completion queue (CQ). The work queue has several types of operations: send, receive, write, and read. The work queue is parsed and processed via an asynchronous scheduling mechanism inside an RDMA network interface card.

(17) Complete queue element (CQE): The complete queue element is placed in the CQ. A CQE is generated when processing of a work queue element (WQE) is completed.

(18) Two-sided operation: The two-sided operation can be completed only when a remote application program performs sensing and participates, and is essentially communication between two processes.

(19) One-sided operation: In the one-sided operation, only a virtual address for remote access needs to be provided, and a remote CPU does not need to participate, which is equivalent to memory copying between a local memory and a remote memory.

The following uses an example to describe an application program scenario in embodiments.

As shown in FIG. 1, a first server 110 needs to directly access a second memory 124 of a second server 120. The first server 110 may be a client server, and the second server 120 may be a serving-end server. First, memories are temporarily pinned to both the first server 110 and the second server 120. In other words, the first server 110 controls, through a first application program 111 of the first server 110, a first registration module 112 to register a memory region, and the second server 120 controls, through a second application program 121 of the second server 120, a second registration module 122 to register a memory region. Specifically, a virtual address of each page in the respective memory is mapped to a physical address according to a virtual-physical address mapping table, and a physical page obtained through mapping is pinned to the registered memory region. Then, the first server 110 initiates a memory access request through the first application program 111 of the first server 110. Access types of the memory access request include a write operation, a send operation, and a read operation, and the read operation may be considered as a reverse operation of the write operation and the send operation. In addition, the first server 110 further includes a first slow storage medium 115, and the second server 120 further includes a second slow storage medium 125, to swap in or out a page in the memory.

For example, when the access type of the memory access request is the write operation or the send operation, the first server 110 obtains, based on a virtual address in the memory access request, a corresponding physical page from the registered memory region in the first memory 114, and sends, through the first network interface card 113, a memory access message including the physical page to the second network interface card 123 of the second server 120. After receiving the memory access message, the second server 120 determines a target virtual address in the memory access message, and determines, in the registered memory region in the second memory 124, a target physical page corresponding to the target virtual address, to write the physical page into the target virtual address.

The following uses an example to describe a procedure of the memory access method provided in embodiments with reference to the foregoing terms and concepts and the application program scenario.

Figure 2:
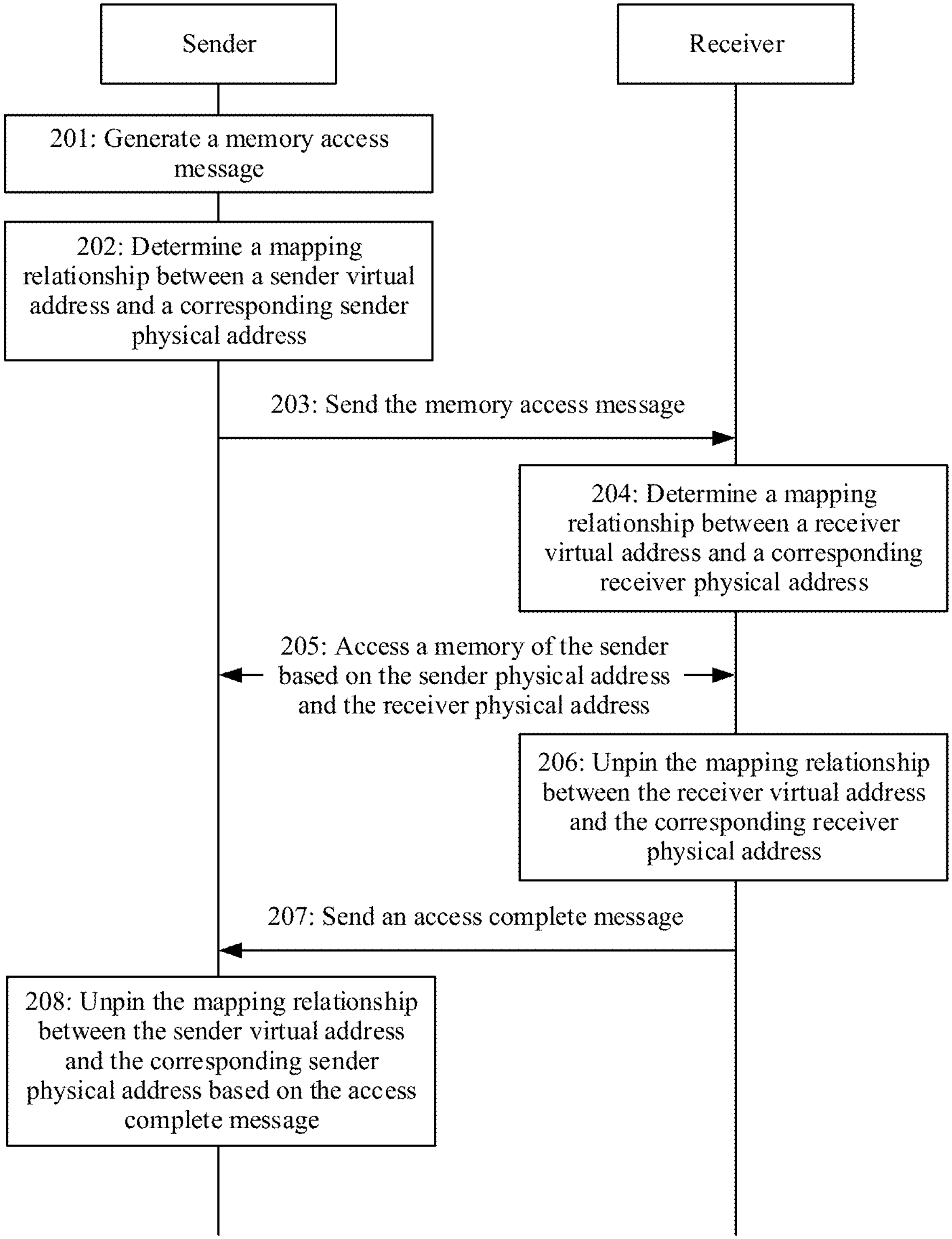
FIG. 2 is a diagram of an embodiment of a memory access method according to an embodiment.

As shown in FIG. 2, an embodiment of the memory access method provided in embodiments includes the following steps:

201: A sender generates a memory access message.

In embodiments, the sender may be the first server described in FIG. 1, and a receiver may be the second server described in FIG. 1. Alternatively, both the sender and receiver may be computer devices. A user initiates a memory access request via an application program of the sender, and the application program generates a corresponding memory access message. The memory access message includes a sender virtual address, a receiver virtual address, and an access type. Content in the memory access message may be determined by the user via the application program, or may be specified by the user in the application program in advance, for example, an access type determined by the user in advance is used by default.

Optionally, after obtaining the memory access message, the sender checks whether there is a page fault in the sender virtual address. If there is a page fault, an operating system of the sender may directly handle the page fault, that is, processing a page fault state of the sender virtual address as a non-page fault state, to ensure that data corresponding to the sender virtual address is accessible. If the page fault cannot be handled, the sender automatically terminates the current access operation, and returns an error prompt to the application program, so that the user modifies the sender virtual address.

202: The sender determines a mapping relationship between the sender virtual address and a corresponding sender physical address.

When the data corresponding to the sender virtual address is accessible, the sender determines the mapping relationship between the sender virtual address and the corresponding sender physical address. In other words, the sender virtual address is temporarily pinned to the corresponding sender physical address, and a virtual-physical address mapping table of a network interface card of the sender is configured, to allow a network interface card of the receiver to read the sender virtual address, and prevent the sender virtual address from being swapped out when the network interface card of the receiver accesses the sender.

203: The sender sends the memory access message to the receiver.

In this case, the sender completes memory pinning to the sender virtual address, but the receiver does not perform memory pinning. Therefore, the sender needs to send the memory access message to the receiver, where the memory access message may further include a length of access data that needs to be transmitted in addition to the sender virtual address, the receiver virtual address, and the access type.

204: The receiver determines a mapping relationship between the receiver virtual address and a corresponding receiver physical address.

After receiving the memory access message from the sender, the receiver determines whether there is a page fault in the receiver virtual address. If there is a page fault, an operating system of the receiver may directly handle the page fault, that is, processing a page fault state of the receiver virtual address as a non-page fault state, to ensure that data corresponding to the receiver virtual address is accessible. If the page fault cannot be handled, the receiver automatically terminates the current access operation, and returns an error prompt to the application program of the sender, so that the user modifies the receiver virtual address.

When the data corresponding to the receiver virtual address is accessible, the receiver determines the receiver virtual address that needs to be used for the current access, and also determines the mapping relationship between the receiver virtual address and the corresponding receiver physical address. In other words, the receiver virtual address is temporarily pinned to the corresponding receiver physical address, and a virtual-physical address mapping table of a network interface card of the receiver is configured, to allow the network interface card of the receiver to write the access data that needs to be transmitted into the receiver virtual address, and prevent the receiver virtual address from being swapped out when the network interface card of the receiver accesses the sender.

205: The receiver accesses a memory of the sender based on the sender physical address and the receiver physical address.

When memories are temporarily pinned to the sender and the receiver, the receiver may access the memory of the sender based on the sender physical address, the receiver physical address, and the access type.

The access type of the memory access request may be a write operation, a send operation, or a read operation, which are described as follows.

1. Write Operation or Send Operation

When the access type is the write operation or the send operation, the receiver fetches, based on the sender physical address and the receiver physical address, the access data corresponding to the sender virtual address into the receiver virtual address, to complete the current memory access. The reading herein is a one-sided operation.

It should be noted that a physical address is directly specified for the write operation, a sending port number is directly specified for the send operation, and a receive operation exists at a peer end.

Optionally, when the receiver virtual address is in the page fault state (the page fault means that the page is swapped out and needs to be swapped in), and the access data is an entire page, the receiver allocates, to the memory, a new page for writing the access data during page fault handling, and directly discards the page, in a slow storage medium of the receiver, that needs to be swapped in, to avoid swap-in overheads.

2. The Access Type is the Read Operation

When the access type is the read operation, the receiver writes, based on the sender physical address and the receiver physical address, the access data corresponding to the receiver virtual address into the sender virtual address, to complete the current memory access. The writing herein is a one-sided operation.

206: The receiver unbinds the mapping relationship between the receiver virtual address and the corresponding receiver physical address.

207: The receiver sends an access complete message to the sender.

208: The sender unbinds the mapping relationship between the sender virtual address and the corresponding sender physical address based on the access complete message.

Optionally, after the current memory access is completed, because both the sender and the receiver are temporarily pinned to the memories, the sender virtual address and the receiver virtual address may not further be used for next memory access. Therefore, the receiver further needs to unbind the mapping relationship between the receiver virtual address and the corresponding receiver physical address, and send the access complete message to the sender to notify the sender that the current memory access is completed. After receiving the access complete message, the sender unbinds the mapping relationship between the sender virtual address and the corresponding sender physical address based on the access complete message.

Optionally, after obtaining the memory access message, the sender determines whether a data size of the access data corresponding to the sender virtual address or a data size of the access data corresponding to the receiver virtual address is greater than a preset threshold, where the preset threshold may be 8 kilobits (kb). If yes, that is, when the access data is large, the sender pins the sender virtual address to the corresponding sender physical address according to the foregoing access strategy.

According to the memory access method provided in embodiments, a memory is no longer allocated or pinned during memory region registration, swap-in and swap-out are supported, and on-demand allocation is supported. A memory dynamically allocated by the user is directly transmitted through the network interface card, and memory copying is not required, to avoid slow initialization of an application program, and prevent memory space from being occupied by idle memory data.

Figure 3:
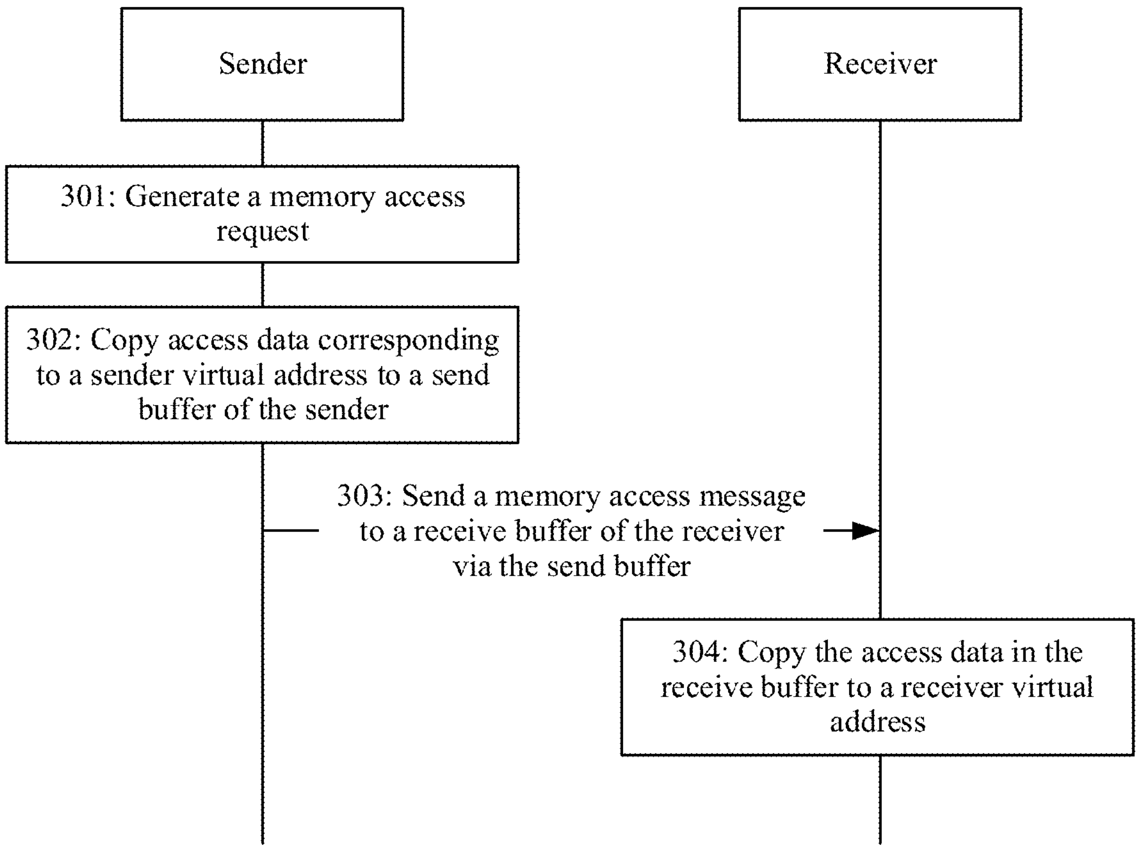
FIG. 3 is a diagram of another embodiment of a memory access method according to an embodiment.

As shown in FIG. 3, another embodiment of the memory access method provided in embodiments includes the following steps:

301: A sender generates a memory access request.

In embodiments, the sender may be the first server described in FIG. 1, and a receiver may be the second server described in FIG. 1. Alternatively, both the sender and receiver may be computer devices. A user initiates the memory access request via an application program of the sender. The memory access request includes a sender virtual address and a receiver virtual address, and content in the memory access request may be determined by the user via the application program, or may be specified by the user in the application program in advance, for example, an access type determined by the user in advance is used by default.

It should be noted that the memory access request further includes an access type. In an embodiment, the default access type is a write operation or a send operation. Therefore, related descriptions about the access type are not described herein again.

302: The sender copies access data corresponding to the sender virtual address to a send buffer of the sender.

After obtaining the memory access request, the sender determines access data on which memory access needs to be performed, and copies the access data corresponding to the sender virtual address to the send buffer of the sender, where a mapping relationship between a virtual address of the send buffer and a corresponding physical address is determined (pinned). In other words, the sender registers all pages in a memory with a memory region of the send buffer in advance, to allow a network interface card of the receiver to read the sender virtual address, and prevent the sender virtual address from being swapped out when the network interface card of the receiver accesses the sender.

Optionally, when copying the access data corresponding to the sender virtual address to the send buffer of the sender, the sender checks whether there is a page fault in the sender virtual address. If there is a page fault, an operating system of the sender may directly handle the page fault, that is, processing a page fault state of the sender virtual address as a non-page fault state, to ensure that the data corresponding to the sender virtual address is accessible. If the page fault cannot be handled, the sender automatically terminates the current access operation, and returns an error prompt to the application program, so that the user modifies the sender virtual address.

303: The sender sends a memory access message to a receive buffer of the receiver via the send buffer.

After copying the access data to the send buffer of the sender, the sender may generate the memory access message in the send buffer. The memory access message includes the receiver virtual address and the access data. The send buffer communicates with the receive buffer based on the physical address. In this case, the sender may determine, based on the mapping relationship, the physical address corresponding to the virtual address, to implement memory access. Optionally, the memory access message may further include the sender virtual address and a length of the access data.

304: The receiver copies the access data in the receive buffer to the receiver virtual address.

After receiving, via the receive buffer, the memory access message sent by the sender via the send buffer, the receiver determines whether there is a page fault in the receiver virtual address. If there is a page fault, an operating system of the receiver may directly handle the page fault, that is, processing a page fault state of the receiver virtual address as a non-page fault state, to ensure that data corresponding to the receiver virtual address is accessible. If the page fault cannot be handled, the receiver automatically terminates the current access operation, and returns an error prompt to the application program of the sender, so that the user modifies the receiver virtual address.

When the data corresponding to the receiver virtual address is accessible, the receiver may copy the access data in the receive buffer to the receiver virtual address, where a virtual address of the receive buffer is pinned to a corresponding physical address. In other words, the receiver registers all pages in a memory with a memory region of the receive buffer in advance, to allow a network interface card of the sender to write the access data into the receiver virtual address, and prevent the receiver virtual address from being swapped out when the network interface card of the receiver accesses the sender.

Optionally, after obtaining the memory access request, the sender determines whether a data size of the access data corresponding to the sender virtual address is greater than a preset threshold, where the preset threshold may be 8 kb. If no, that is, when the access data is small, the sender copies, according to the foregoing access strategy, the access data corresponding to the sender virtual address to the send buffer of the sender.

Figure 4:
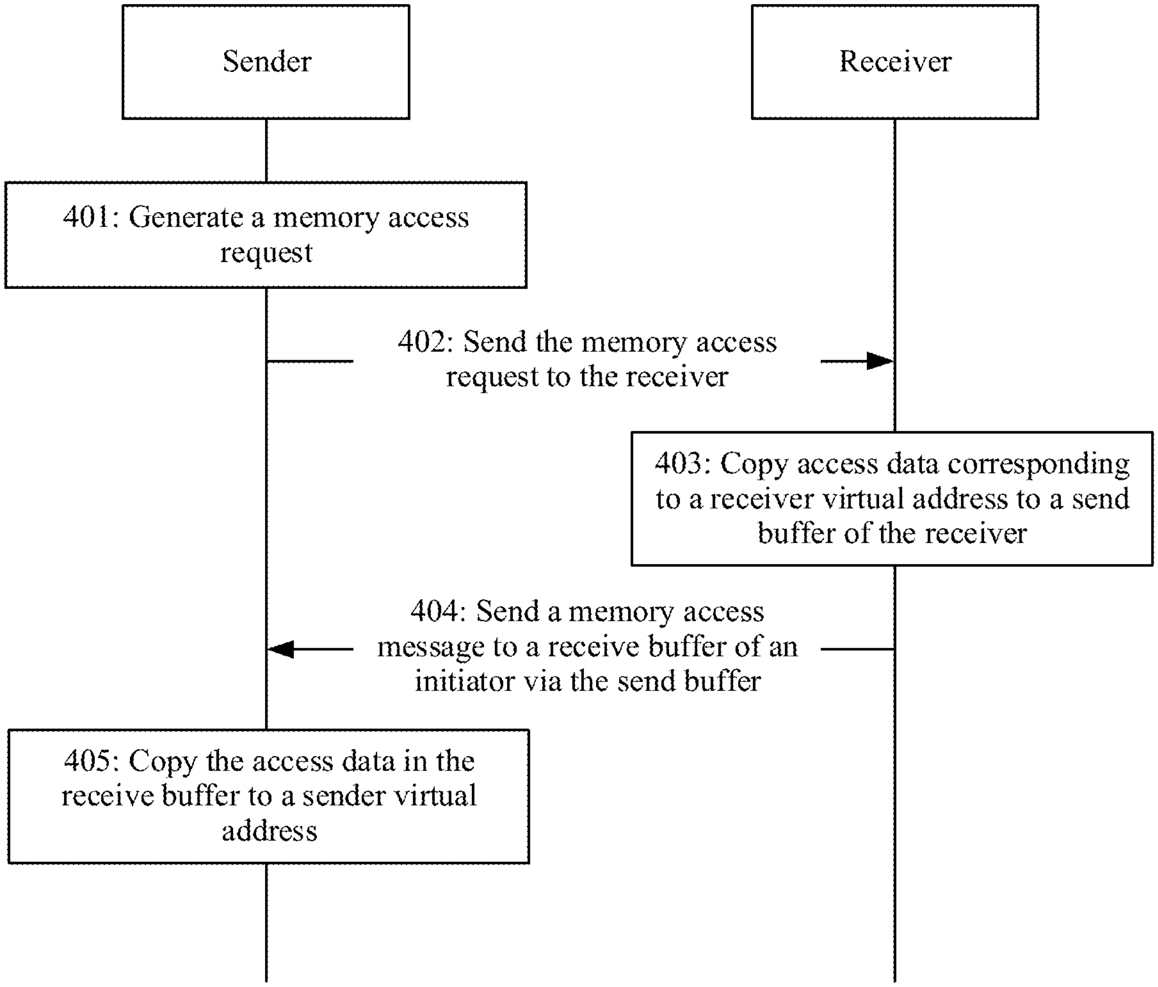
FIG. 4 is a diagram of another embodiment of a memory access method according to an embodiment.

As shown in FIG. 4, another embodiment of the memory access method provided in embodiments includes the following steps:

401: A sender generates a memory access request.

402: The sender sends the memory access request to a receiver.

In embodiments, the sender may be the first server described in FIG. 1, and the receiver may be the second server described in FIG. 1. Alternatively, both the sender and receiver may be computer devices. A user initiates the memory access request via an application program of the sender. The memory access request includes a sender virtual address and a receiver virtual address, and content in the memory access request may be determined by the user via the application program, or may be specified by the user in the application program in advance, for example, an access type determined by the user in advance is used by default.

It should be noted that the memory access request further includes an access type. In an embodiment, the default access type is a read operation. Therefore, related descriptions about the access type are not described herein again.

After obtaining the memory access request, the sender directly sends the memory access request to the receiver.

403: The receiver copies access data corresponding to the receiver virtual address to a send buffer of the receiver.

After obtaining the memory access request, the receiver determines access data on which memory access needs to be performed, and copies the access data corresponding to the receiver virtual address to the send buffer of the receiver, where a virtual address of the send buffer is pinned to a corresponding physical address. In other words, the receiver registers all pages in a memory with a memory region of the send buffer in advance, to allow a network interface card of the sender to read the sender virtual address, and prevent the receiver virtual address from being swapped out when a network interface card of the receiver accesses the sender.

Optionally, when copying the access data corresponding to the receiver virtual address to the send buffer of the receiver, the receiver checks whether there is a page fault in the receiver virtual address. If there is a page fault, an operating system of the receiver may directly handle the page fault, that is, processing a page fault state of the receiver virtual address as a non-page fault state, to ensure that the data corresponding to the receiver virtual address is accessible. If the page fault cannot be handled, the receiver automatically terminates the current access operation, and returns an error prompt to the application program of the sender, so that the user modifies the receiver virtual address.

404: The receiver sends a memory access message to a receive buffer of the sender via the send buffer.

After copying the access data to the send buffer of the receiver, the receiver may generate the memory access message in the send buffer. The memory access message includes the sender virtual address and the access data. The send buffer communicates with the receive buffer based on the physical address. In this case, the sender may determine, based on the mapping relationship, the physical address corresponding to the virtual address, to implement memory access. Optionally, the memory access message may further include the receiver virtual address and a length of the access data.

405: The sender copies the access data in the receive buffer to the sender virtual address.

After receiving, via the receive buffer, the memory access message sent by the receiver via the send buffer, the sender determines whether there is a page fault in the sender virtual address. If there is a page fault, an operating system of the sender may directly handle the page fault, that is, processing a page fault state of the sender virtual address as a non-page fault state, to ensure that data corresponding to the sender virtual address is accessible. If the page fault cannot be handled, the sender automatically terminates the current access operation, and returns an error prompt to the application program, so that the user modifies the sender virtual address.

When the data corresponding to the sender virtual address is accessible, the sender may copy the access data in the receive buffer to the sender virtual address, where a virtual address of the receive buffer is pinned to a corresponding physical address. In other words, the sender registers all pages in a memory with a memory region of the receive buffer in advance, to allow the network interface card of the sender to read the access data into the sender virtual address, and prevent the sender virtual address from being swapped out when the network interface card of the receiver accesses the sender.

Optionally, after obtaining the memory access request, the sender determines whether a data size of the access data corresponding to the sender virtual address is greater than a preset threshold, where the preset threshold may be 8 kb. If no, that is, when the access data is small, the sender sends the memory access request to the receiver according to the foregoing access strategy.

Figure 5:
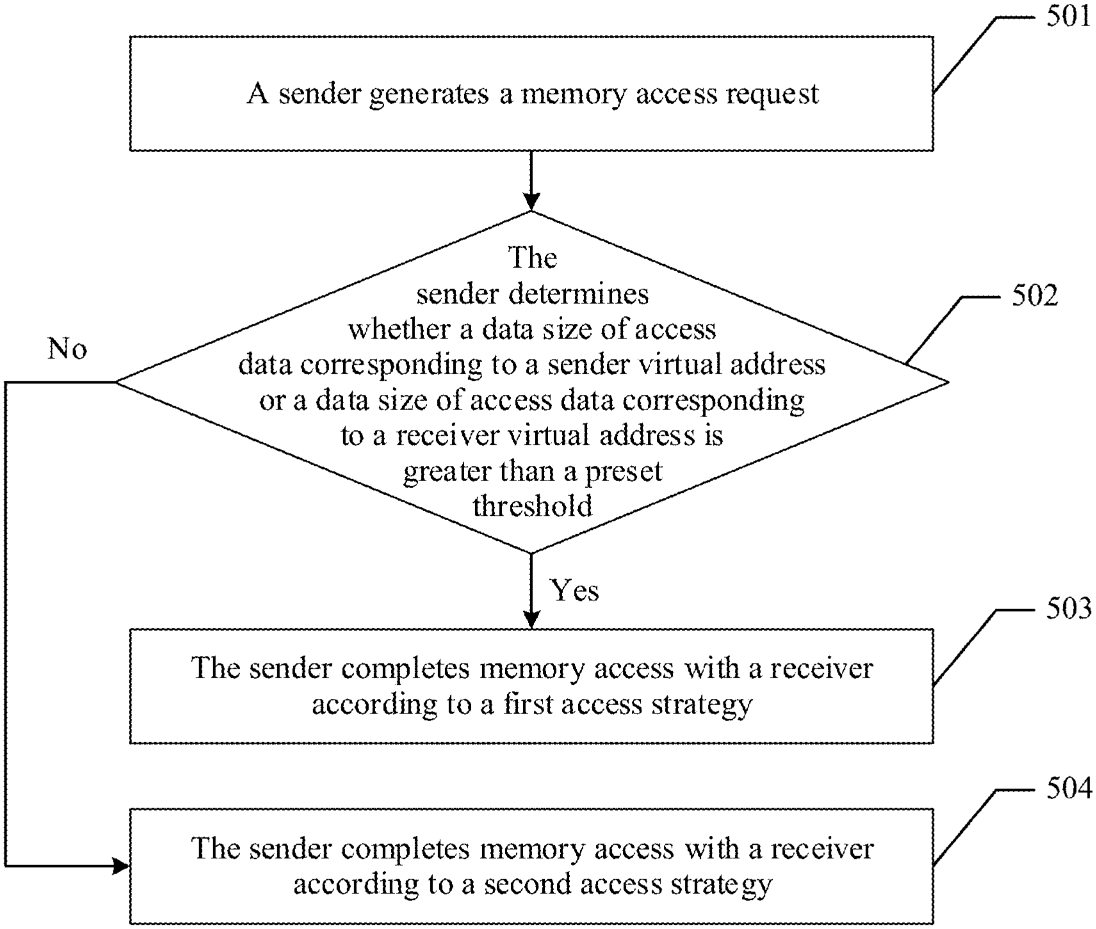
FIG. 5 is a diagram of another embodiment of a memory access method according to an embodiment.
Figure 6A:
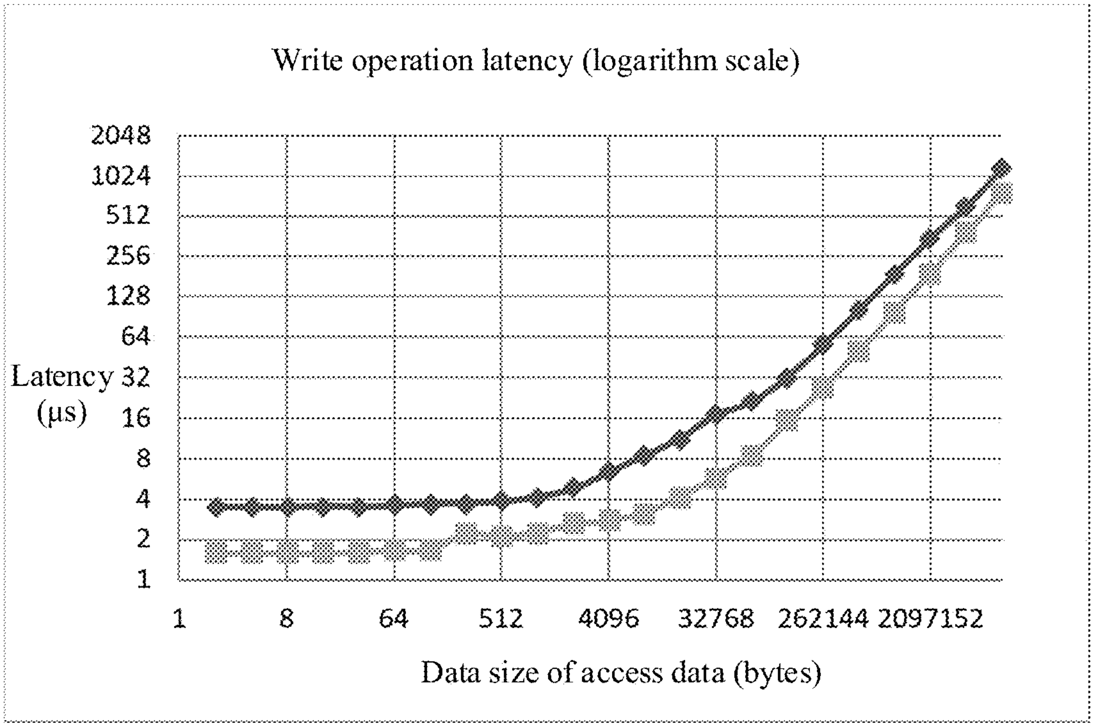
FIG. 6A to FIG. 6D are diagrams of comparison results between one technology and a memory access method according to an embodiment.
Figure 6B:
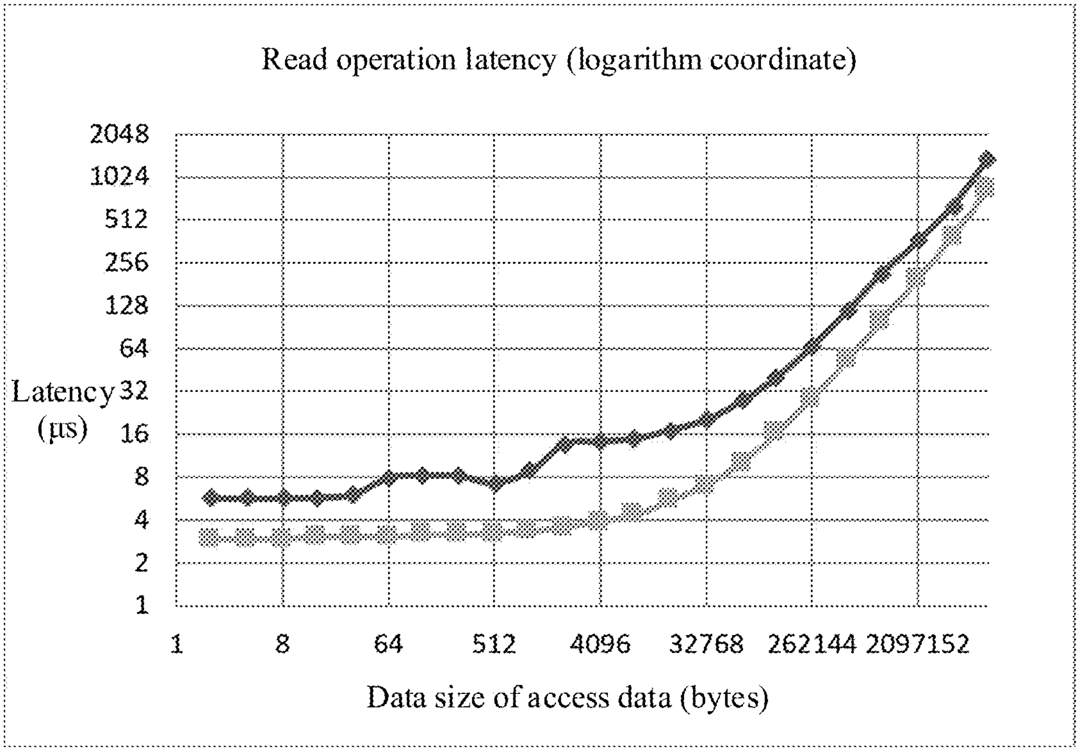
Figure 6C:
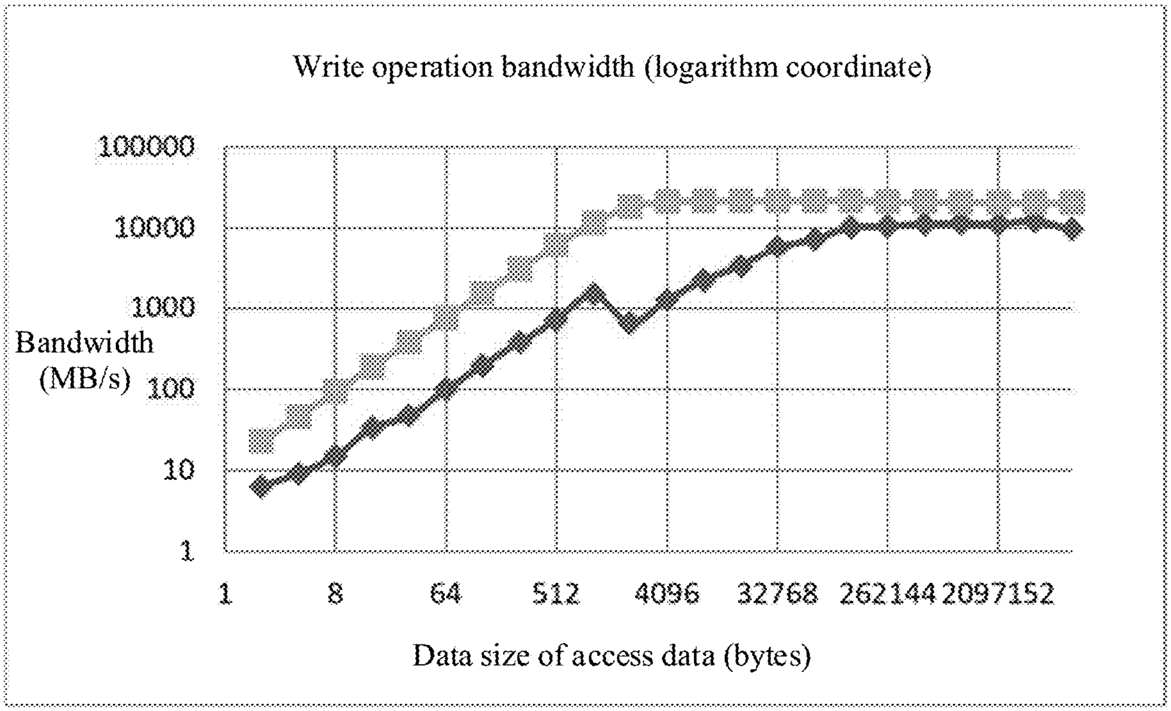
Figure 6D:
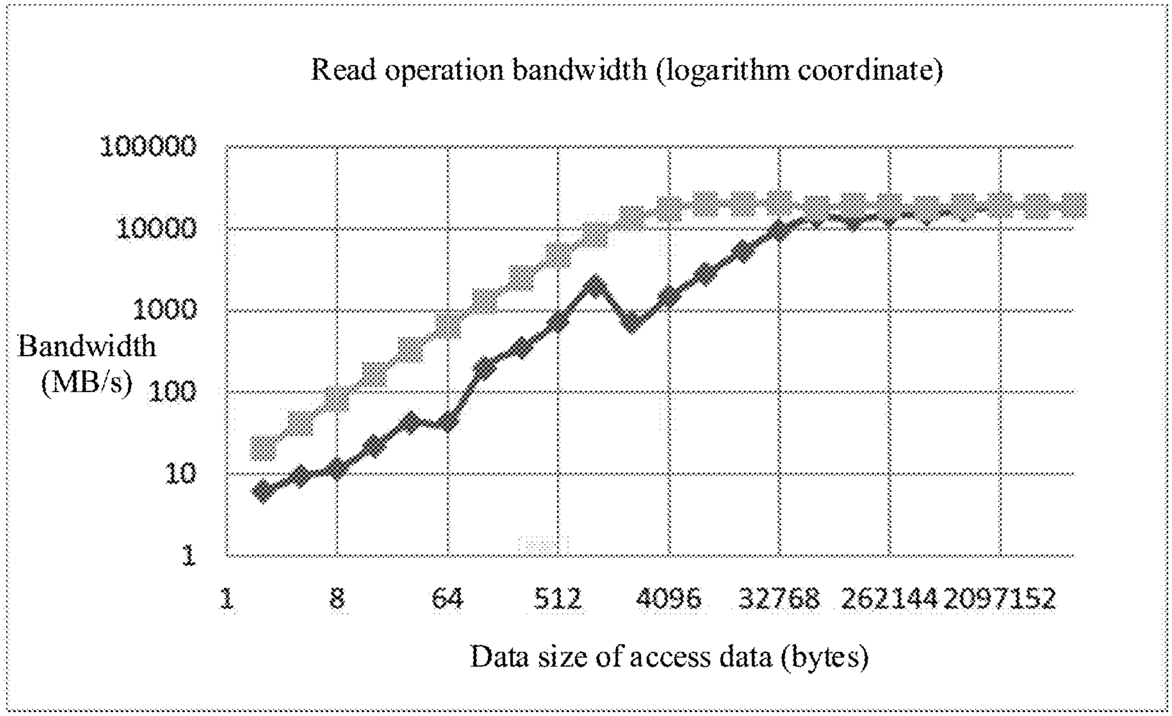

As shown in FIG. 5, another embodiment of the memory access method provided in embodiments includes the following steps:

501: A sender generates a memory access request.

502: The sender determines whether a data size of access data corresponding to a sender virtual address or a data size of access data corresponding to a receiver virtual address is greater than a preset threshold.

503: If yes, the sender completes memory access with the receiver according to a first access strategy.

504: If no, the sender completes memory access with the receiver according to a second access strategy.

In an embodiment, after obtaining the memory access request, the sender determines whether the data size of the access data corresponding to the sender virtual address or the data size of the access data corresponding to the receiver virtual address is greater than the preset threshold, where the preset threshold may be 8 kb. If the access data is greater than 8 kb, it is considered that the access data is a large message, and the sender completes memory access with the receiver according to the first access strategy, that is, using the memory access method described in the foregoing embodiment in FIG. 2. If the access data is less than (or equal to) 8 kb, it is considered that the access data is a small message, and the sender completes memory access with the receiver according to the second access strategy. When an access type is a write operation or a send operation, the memory access method described in the foregoing embodiment in FIG. 3 is used. When the access type is a read operation, the memory access method described in the foregoing embodiment in FIG. 4 is used. For specific implementations, refer to corresponding parts in the foregoing embodiments. Details are not described herein again.

Optionally, in the foregoing process, when the sender sends a memory access message to the receiver, the sender or the receiver may pin a non-order-preserving tag to the memory access message. After the non-order-preserving tag is pinned, a strict ordering limitation on a plurality of memory access requests during memory access may be eliminated. When a memory access request is blocked due to a page fault or another reason, a non-order-preserving tag is pinned to a memory access message corresponding to the memory access request. In this case, the memory access request is skipped, and out-of-order memory access is implemented. This prevents a memory access request that is slowly processed from blocking a subsequent memory access request.

In embodiments, for a large message, the sender checks whether the sender virtual address in the memory access request is allocated, swaps a page in on demand, dynamically registers virtual-physical address mapping of the sender virtual address, and sends information such as the access type, the sender virtual address, and the receiver virtual address to the receiver via a two-sided memory access message. The receiver receives the memory access message, checks whether the receiver virtual address is allocated, swaps a page in on demand, and dynamically registers virtual-physical address mapping of the receiver virtual address. The receiver performs memory access via a one-sided message, and completes data transmission. Finally, the receiver removes the virtual-physical address mapping of the receiver virtual address, notifies, via a two-sided access complete message, the sender to remove the virtual-physical address mapping of the sender virtual address, and sends a complete notification to an application program of the sender. Dynamic registration of virtual-physical address mapping in the foregoing procedure means invoking an interface of an operating system to temporarily pin mapping between a virtual page and a physical page, and updating a virtual-physical address translation table of an IOMMU, an SMMU, or a network interface card, so that the network interface card performs virtual-physical address translation. For a small message, the sender and the receiver each use a pre-registered buffer for copying and forwarding, to eliminate overheads of dynamically registering virtual-physical address mapping.

As shown in FIG. 6A to FIG. 6D, a rectangular point represents an experimental result value of the memory access method provided in embodiments, and a diamond point represents an experimental result value of a theoretical optimal solution of memory pinning in one technology. A read operation latency for 2-byte access data is 5.7 microseconds (μs), which is 2.7 μs larger than a value of the theoretical optimal solution of memory pinning in the technology. A write operation latency is 3.5 μs, which is 2 μs larger than a value of the theoretical optimal solution of memory pinning in the technology. A read operation latency for 8 KB access data is 15 μs, which is 10.6 μs larger than a value of the theoretical optimal solution of memory pinning in the technology, and a write operation latency is 8 μs, which is 5 μs larger than a value of the theoretical optimal solution of memory pinning in the technology.

It can be learned from the foregoing embodiments that beneficial effect brought by embodiments includes but is not limited to the following four points:

(1) When a memory access request is initiated, only access data that needs to be used is temporarily pinned to a memory. Therefore, the receiver may access a memory of the sender, and allows swap-in and swap-out, to avoid slow initialization of an application program, and prevent memory space from being occupied by idle memory data.

(2) When a memory access request is initiated, only the access data needs to be copied to a send buffer of a pinned memory, and the access data is directly sent to a receive buffer of a pinned memory in the receiver. This ensures that a network interface card uses pinned physical addresses, reverse communication is not required, and a subsequent memory access request is not blocked when there is a page fault, and reduces overheads of reverse communication.

(3) When the access data is greater than a preset threshold, a temporary memory pinning method is used to avoid slow initialization of an application program, and prevent memory space from being occupied by idle memory data due to registration of a large amount of data. In addition, the access data does not need to be copied. When the access data is less than the preset threshold, a copy method is used to reduce overheads of reverse communication, and registration of access data with a small data size does not cause slow initialization of an application program and occupation of memory space by idle memory data.

(4) When the receiver virtual address is in a page fault state (the page fault means that the page is swapped out and needs to be swapped in), and the access data is an entire page, the receiver allocates a new page for writing the access data during page fault handling, and directly discards the page, in a slow storage medium of the receiver, that needs to be swapped in, to avoid swap-in overheads.

The foregoing describes the memory access method provided in embodiments. The following describes a related device provided in embodiments.

Figure 7:
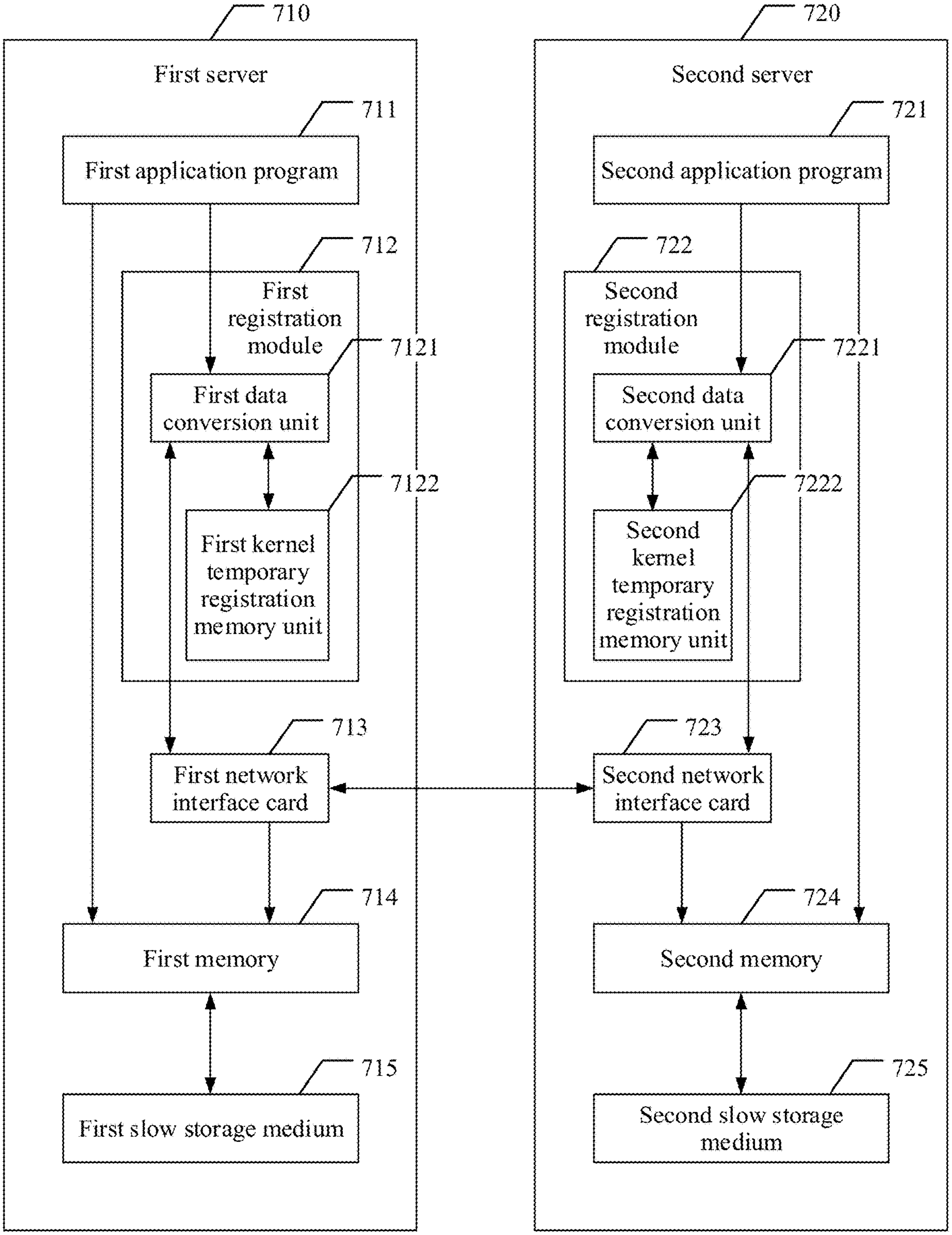
FIG. 7 is a diagram of an embodiment of a communication system according to an embodiment.

As shown in FIG. 7, an embodiment of a communication system provided in embodiments includes a first server and a second server.

The first server is configured to perform memory access on the second server. The first server may be specifically the sender described in embodiments in FIG. 2 to FIG. 5, and the second server may be specifically the receiver described in the embodiments in FIG. 2 to FIG. 5.

Specifically, the communication system may implement, based on an RDMA technology, the memory access method provided in embodiments. In comparison with FIG. 1, the first registration module and the second registration module are modified in this embodiment. The communication system includes the first server and the second server, the first server includes a first application program, a first registration module, a first network interface card, a first memory, and a first slow storage medium, and the second server includes a second application program, a second registration module, a second network interface card, a second memory, and a second slow storage medium. The first registration module includes a first data conversion unit and a first kernel temporary registration memory unit, and the second registration module includes a second data conversion unit and a second kernel temporary registration memory unit.

The first registration module is used as an example. The first data conversion unit may be considered as a communication library, and is configured to convert a unidirectional memory access message in the RDMA into a bidirectional memory access message described in the embodiment in FIG. 2, and provide an application programming interface (API) that is the same as that in the existing RDMA, to implement the memory access method provided in FIG. 2. The first kernel temporary registration memory unit is configured to temporarily register, with an IOMMU/SMMU or an MTT table of the first network interface card, a buffer that may be required for sending or receiving access data, so that the first network interface card can access the virtual address to implement the memory access method provided in FIG. 3 or FIG. 4.

Figure 8:
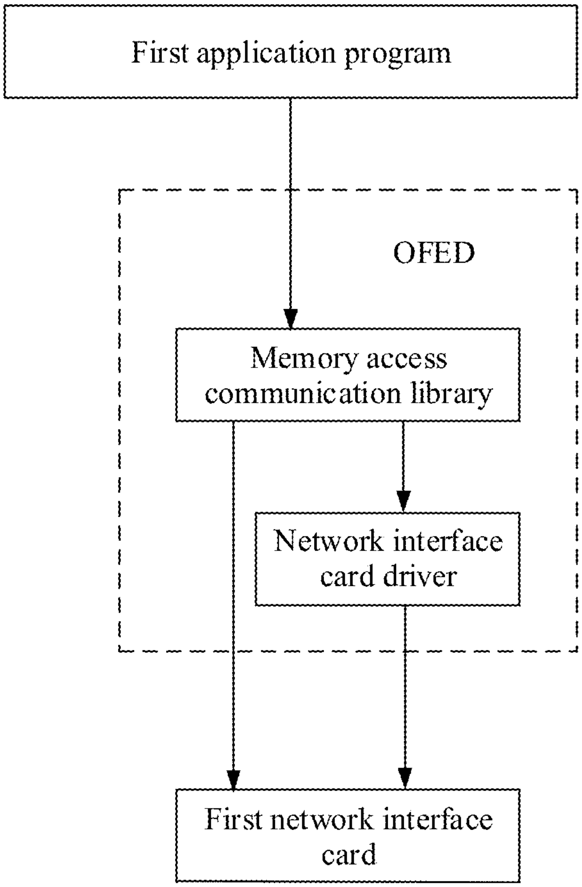
FIG. 8 is a diagram of an embodiment of a software architecture of a server according to an embodiment.

From a perspective of a software level of the first registration module, as shown in FIG. 8, program code of the memory access method provided in embodiments is a part of an Open Fabrics Enterprise Distribution (OFED) software package, and includes a modified memory access communication library (for example, a libibverbs library) and a modified network interface card driver. During running, the program code is run in the first memory of the first server, and the modified remote memory access communication library and the original OFED software package provide a same interface for the first application program. The first registration module at the software level specifically has two implementations, which are separately described in the following:

1. A Network Interface Card is Intrusively Modified

Figure 9:
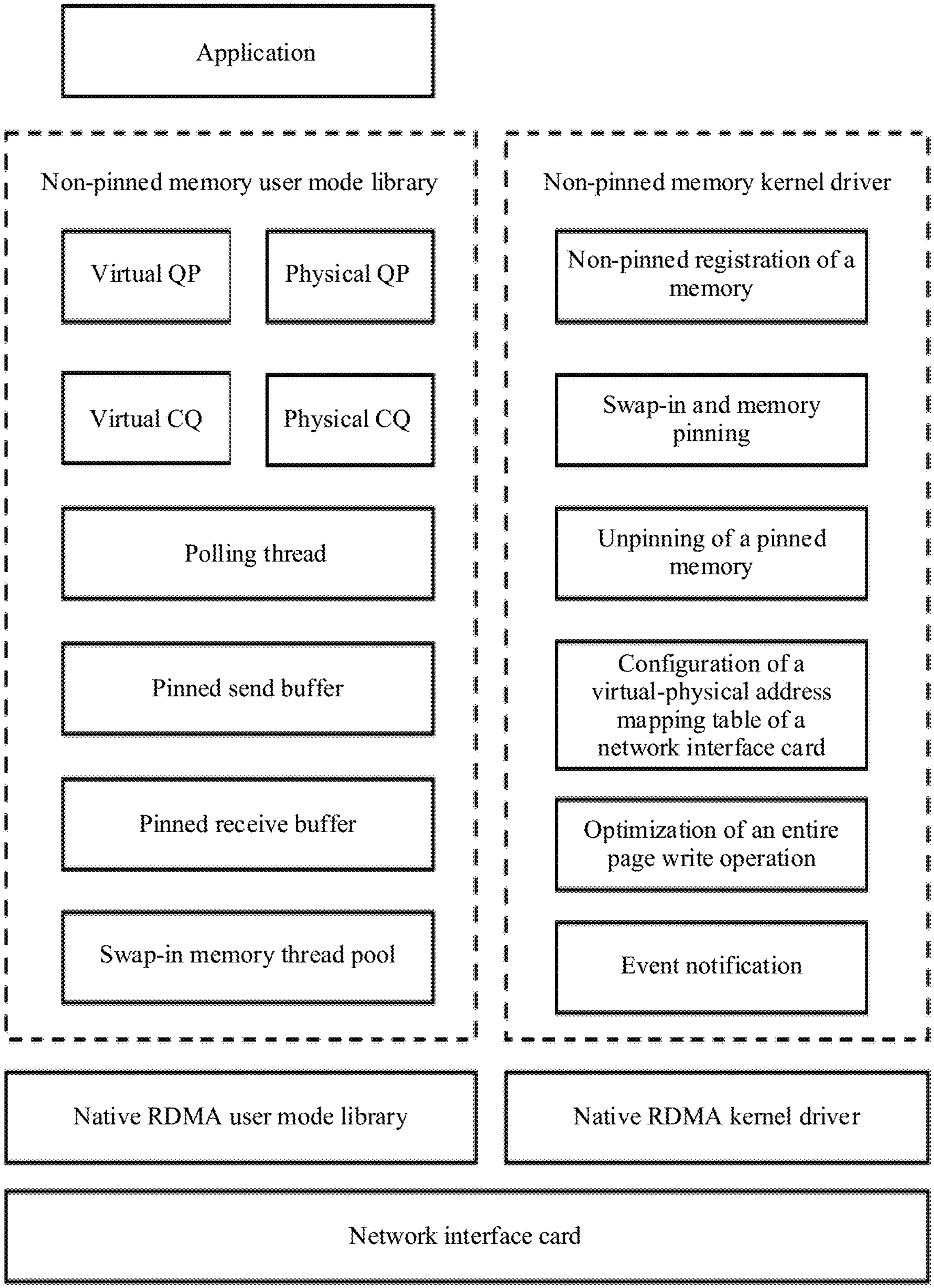
FIG. 9 is a diagram of another embodiment of a software architecture of a server according to an embodiment.

As shown in FIG. 9, the first registration module includes a non-pinned memory user mode library, a non-pinned memory kernel driver, an existing native RDMA user mode library, and a native RDMA kernel driver. The non-pinned memory user mode library corresponds to the memory access communication library in FIG. 8, a hardware level corresponds to the first data conversion unit in FIG. 7, the non-pinned memory kernel driver corresponds to the network interface card driver in FIG. 8, and a hardware level corresponds to the first kernel temporary registration memory unit in FIG. 7.

The non-pinned memory user mode library implements RDMA standard interfaces, and includes functional blocks such as registering a non-pinned MR, sending a memory access message to a QP, polling a CQ, waiting for a completion event notification (e.g., CQ Event), a polling thread, a pinned send buffer, a pinned receive buffer, and a swap-in memory thread pool. In this way, the application program only needs to replace the existing native RDMA user mode library with the non-pinned memory user mode library, or use an environment variable manner to specify that the non-pinned memory user mode library is used (another application program still uses a pinned memory), to implement the memory access method provided in embodiments.

The non-pinned memory kernel driver modifies the function of registering a memory region, implements non-pinned registration of a memory region, and newly adds functional blocks such as swap-in and memory pinning, unpinning of a pinned memory, configuration of a virtual-physical address mapping table of a network interface card, optimization of an entire page write operation, and sending of an event notification to a specified completion queue. Network interface cards of some models do not provide the function of dynamically modifying a built-in virtual-physical address mapping table (MTT) of the network interface card, and use IOMMU/SMMU mapping of a CPU as a level-2 mapping table. In this case, the IOMMU/SMMU needs to be enabled in a basic input/output system (BIOS) and kernel startup configuration.

In an application program process, when an application program registers an MR, the non-pinned memory user mode library transfers an additional parameter to the kernel driver to register a non-pinned memory. The kernel driver allocates an IOVA and configures the mapping table of the IOMMU/SMMU as virtual memory mapping. For example, all IOVA pages are mapped to a dedicated idle page. Then, the kernel driver fills in a virtual-physical address mapping table of the network interface card, and maps a virtual address (VA) to the allocated IOVA, so that VAs in one MR one-to-one correspond to IOVAs. This step is the same as registration of a memory region in a pinned memory. When the application program creates a connection (e.g., QP), the non-pinned user mode library invokes the native RDMA user mode library, and the native RDMA user mode library invokes the native RDMA kernel driver, to create a physical connection (e.g., QP). Then, the non-pinned user mode library creates a pinned send buffer and receive buffer for sending and receiving access data. When the application program creates a CQ, the non-pinned user mode library creates a user mode completion queue, and invokes the native RDMA user mode library. The native RDMA user mode library invokes the native RDMA kernel driver, to create a physical completion queue used to receive a notification sent by a peer end.

When the non-pinned user mode library initializes a first CQ, and an event is processed, a polling thread is created to record mapping relationships between all completion queues and physical completion queues when the CQ sends the completion event. The polling thread queries each physical completion queue in turn. If a CQE is found, processing is performed based on a type of the completion event. For details, refer to a corresponding part in the foregoing method embodiments.

When the application program sends a work request (WQ) to a connection (e.g., QP), the non-pinned memory user mode library calculates, for each work request in a work request linked list, a total size of a local memory accessed by the work request; and if the total size is less than a preset threshold (8 kb), copies, to a pinned memory region used for transmission, a memory element specified by each scatter/gather element (SGE) of the work request. If the total size is greater than the preset threshold, a remote address, and a local address and a length of each scatter transmission element that are specified in the working request are packaged into a message, and the message is sent to a remote end.

When the application program attempts to receive a CQE from the CQ, the non-pinned memory user mode library queries whether there is an event in a user mode virtual CQ and returns the complete queue element to the user.

When the application program attempts to enable a completion event notification function on the CQ, the non-pinned memory user mode library does not enable the function in the kernel driver. A reason lies in that the completion event reported by the network interface card is different from a completion event that the user cares about. Therefore, the non-pinned memory user mode library needs to generate a completion event.

When the operating system needs to perform a swap-in memory operation, but the swap-in memory operation of the operating system is synchronous, another remote memory access operation cannot be processed during the swap-in memory operation. The non-pinned memory user mode database uses a plurality of threads, to improve performance.

2. A Network Interface Card is not Modified

In some scenarios (for example, big data computing or a server of a client cannot be modified), server deployment is limited. Therefore, only the user mode library may be newly added, and the existing kernel driver and user mode library of the network interface card are not modified, to achieve effect similar to that of intrusive modification of the network interface card.

Figure 10:
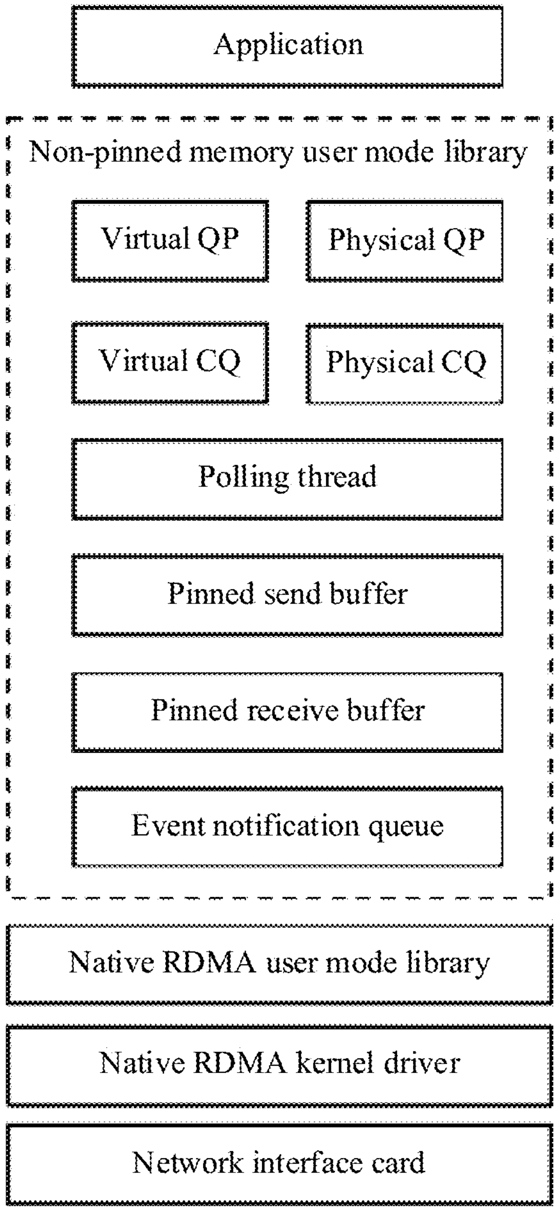
FIG. 10 is a diagram of another embodiment of a software architecture of a server according to an embodiment.

As shown in FIG. 10, the non-pinned memory user mode library is used in a manner of configuring an environment variable (LD_PRELOAD) by the user, and provides a same interface as the native RDMA user mode library. The application program invokes the RDMA interface through translation by the non-pinned memory user mode library, and the native RDMA user mode library and the kernel driver are used to access a network interface card of the server.

When the user registers a memory region, the memory region does not need to be registered with the network interface card. When the access data is greater than the threshold, non-pinned memory user mode libraries of the sender and the receiver each register a temporary memory region. After reverse read/write ends, the registered temporary memory regions are unpinned, so that the network interface card driver does not need to be modified. This has an advantage in deployment.

To reduce CPU overheads of polling, an interrupt mode is used in the network interface card to replace a polling mode. In the polling thread, a network interface card interrupt mechanism and a kernel driver event notification mechanism are used to wait for a completion event.

When the application program registers an MR, the non-pinned memory user mode library does not register the memory region, but generates a virtual memory region in the user mode library, and records a list of allocated memory regions in the user mode library.

When the application program creates a connection (e.g., QP), the non-pinned user mode library invokes the native RDMA user mode library, and the native RDMA user mode library invokes the native RDMA kernel driver, to create a physical connection (e.g., QP). Then, the non-pinned user mode library creates a pinned send buffer and receive buffer for sending and receiving access data.

When the application program creates a completion event notification channel, the non-pinned memory user mode library does not invoke the kernel driver to create the completion event notification channel. Instead, the non-pinned memory user mode library simulates the behavior in a user mode to avoid conflict with the completion event notification mechanism of the polling thread. The non-pinned memory user mode library creates a file descriptor for each event notification channel, and the file descriptor can be implemented through mechanisms such as a pipe and an event (e.g., eventfd). When the application program waits for the completion event notification, the non-pinned memory user mode library performs reading from the file descriptor in a blocking manner. When the non-pinned memory user mode library generates a completion event, the file descriptor of the event notification channel corresponding to the completion queue is written to wake up a waiting process.

When the application program creates a CQ, the non-pinned memory user mode library creates a user mode completion queue, and invokes the native RDMA user mode library. The native RDMA user mode library invokes the native RDMA kernel driver, to create a physical completion queue used to receive a notification sent by a peer-end device. If the application program needs to pin a completion event notification channel when creating the completion queue, the non-pinned memory user mode library records completion channel information of the completion queue. The non-pinned memory user mode library pins a public completion event notification channel to the completion queue in the network interface card via the native RDMA user mode library, where the public completion event notification channel is used to receive a completion event from the network interface card. The public completion event notification channel is shared by completion queues, and may be created when the non-pinned memory user mode library is initialized or when the completion queue is created for the first time.

When the non-pinned memory user mode library initializes a first CQ, a polling thread is created to record mapping relationships between all completion queues and physical completion queues. The polling thread waits on the public completion event notification channel. When there is a completion event (e.g., CQE), processing is performed based on a type of the completion event. For details, refer to a corresponding part in the foregoing method embodiments.

When the application program sends a WQ to the QP, the procedure is basically the same as that in the first case. A difference lies in that, for the large message, when the memory is temporarily pinned, the non-pinned memory user mode library of the sender registers a temporary memory region that uses a local memory address as a start address and uses a length of sent or received data as a length, and packages an access token (e.g., rkey) of the memory region into the message and sends the message to a remote device.

The foregoing two cases are independent of each other, and may be used in combination. Details are not described herein.

Figure 11:
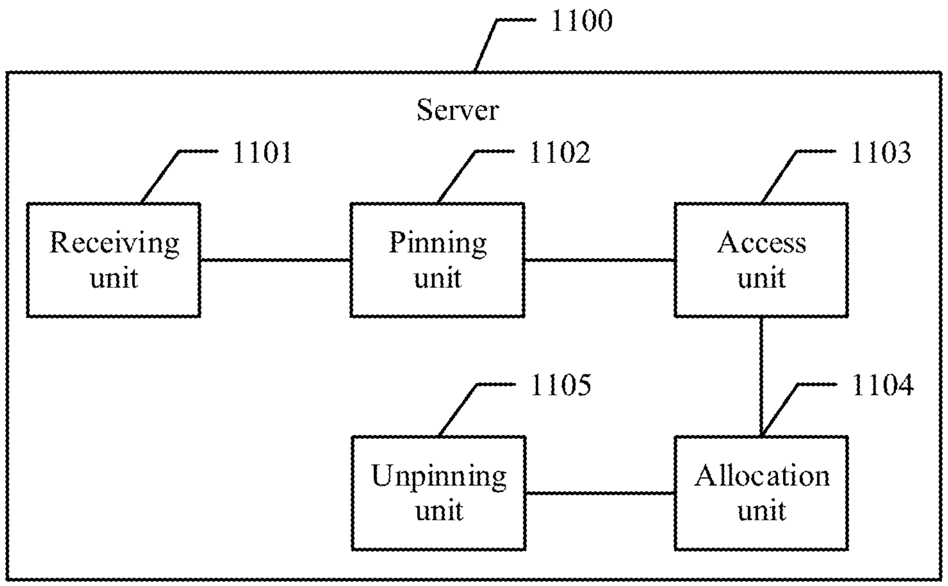
FIG. 11 is a diagram of an embodiment of a server according to an embodiment.

As shown in FIG. 11, an embodiment of a server 1100 provided in embodiments includes: a receiving unit 1101 configured to receive a memory access message from a sender, where the memory access message includes a sender virtual address and a receiver virtual address, and a mapping relationship between the sender virtual address and a corresponding sender physical address is determined; a pinning unit 1102 configured to determine a mapping relationship between the receiver virtual address and a corresponding receiver physical address; and an access unit 1103 configured to access a memory of the sender based on the sender physical address and the receiver physical address.

Optionally, an access type is a write operation or a send operation. The access unit 1103 is further configured to fetch, based on the sender physical address and the receiver physical address, access data corresponding to the sender virtual address into the receiver virtual address.

Optionally, the server 1100 further includes an allocation unit 1104. The allocation unit 1104 is configured to: when the receiver virtual address is in a page fault state and the access data is an entire page, allocate a new page in a memory for writing the access data.

Optionally, the access type is a read operation. The access unit 1103 is further configured to write, based on the sender physical address and the receiver physical address, access data corresponding to the receiver virtual address into the sender virtual address.

Optionally, the server 1100 further includes an unpinning unit 1105. The unpinning unit 1105 is configured to unbind the mapping relationship between the receiver virtual address and the corresponding receiver physical address, and send an access complete message to the sender, so that the sender unbinds the mapping relationship between the sender virtual address and the corresponding sender physical address.

Optionally, a data size of the access data corresponding to the sender virtual address or a data size of the access data corresponding to the receiver virtual address is greater than a preset threshold.

Figure 12:
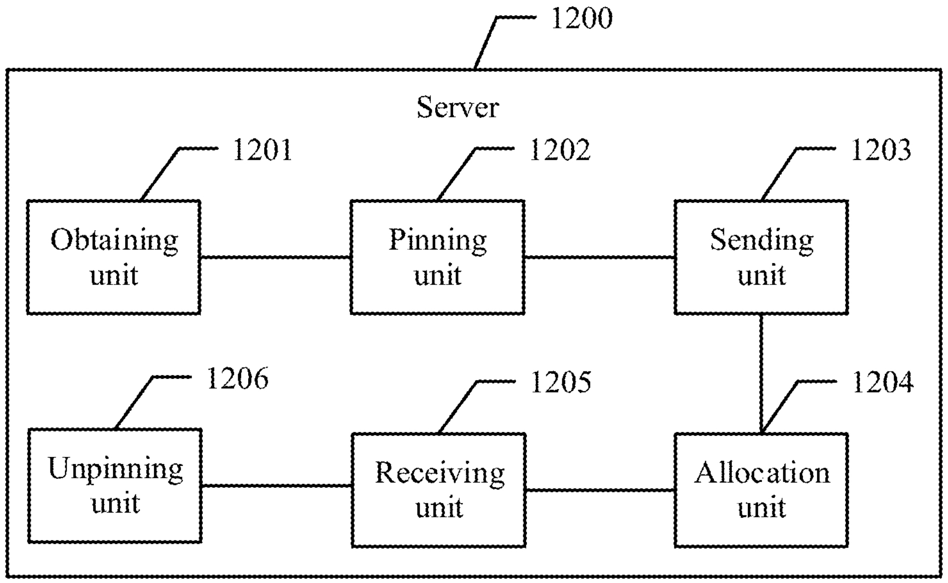
FIG. 12 is a diagram of another embodiment of a server according to an embodiment.

As shown in FIG. 12, another embodiment of a server 1200 provided in embodiments includes: an obtaining unit 1201 configured to obtain a memory access message, where the memory access message includes a sender virtual address and a receiver virtual address; a pinning unit 1202 configured to determine a mapping relationship between the sender virtual address and a corresponding sender physical address that are pinned; and a sending unit 1203 configured to send the memory access message to a receiver, so that the receiver determines a mapping relationship between the receiver virtual address and a corresponding receiver physical address, and accesses a memory of the sender based on the sender physical address and the receiver physical address.

Optionally, when an access type is a write operation or a send operation, the receiver is further configured to fetch the access data corresponding to the sender virtual address into the receiver virtual address.

Optionally, the server 1200 further includes an allocation unit 1204. The allocation unit 1204 is configured to: when the receiver virtual address is in a page fault state and the access data is an entire page, allocate a new page in a memory for writing the access data.

Optionally, when the access type is a read operation, the receiver is further configured to write the access data corresponding to the receiver virtual address into the sender virtual address.

Optionally, the server 1200 further includes a receiving unit 1205 and an unpinning unit 1206. The receiving unit 1205 is configured to receive an access complete message sent by the receiver. The unpinning unit 1206 is used by a sender to unbind the mapping relationship between the sender virtual address and the corresponding sender physical address based on the access complete message.

Optionally, the pinning unit 1202 is further configured to: determine whether a data size of the access data corresponding to the sender virtual address or a data size of the access data corresponding to the receiver virtual address is greater than a preset threshold; and if yes, determine the mapping relationship between the sender virtual address and the corresponding sender physical address.

Figure 13:
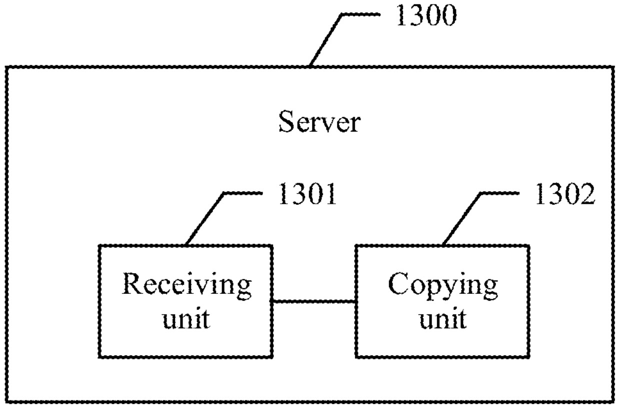
FIG. 13 is a diagram of another embodiment of a server according to an embodiment.

As shown in FIG. 13, another embodiment of a server 1300 provided in embodiments includes: a receiving unit 1301 configured to receive, via a receive buffer, a memory access message sent by a sender via a send buffer, where the memory access message includes a receiver virtual address and access data, the access data is obtained by copying, by the sender, data corresponding to a sender virtual address to the send buffer, a mapping relationship between a virtual address of the send buffer and a corresponding physical address is determined, a mapping relationship between a virtual address of the receive buffer and a corresponding physical address is determined, and the send buffer communicates with the receive buffer based on the physical address; and a copying unit 1302 configured to copy the access data in the receive buffer to the receiver virtual address.

Optionally, a data size of the access data corresponding to the sender virtual address is less than a preset threshold.

Figure 14:
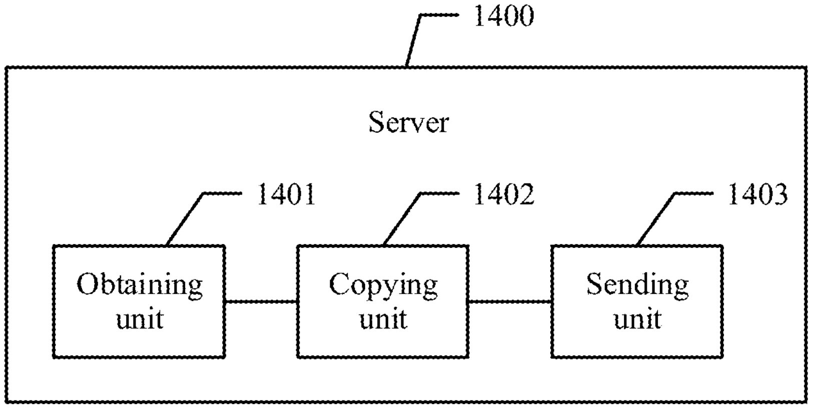
FIG. 14 is a diagram of another embodiment of a server according to an embodiment.

As shown in FIG. 14, another embodiment of a server 1400 provided in embodiments includes: an obtaining unit 1401 configured to generate a memory access request, where the memory access request includes a sender virtual address and a receiver virtual address; a copying unit 1402 configured to copy access data corresponding to the sender virtual address to a send buffer of a sender, where a mapping relationship between a virtual address of the send buffer and a corresponding physical address is determined; and a sending unit 1403 configured to send a memory access message to a receive buffer of a receiver via the send buffer, so that the receiver copies access data in the receive buffer to the receiver virtual address, where the memory access message includes the receiver virtual address and the access data, a mapping relationship between a virtual address of the receive buffer and a corresponding physical address is determined, and the send buffer communicates with the receive buffer based on the physical address.

Optionally, the copying unit 1402 is further configured to: determine whether a data size of the access data corresponding to the sender virtual address is greater than a preset threshold; and if no, copy the access data corresponding to the sender virtual address to the send buffer of the sender.

Figure 15:
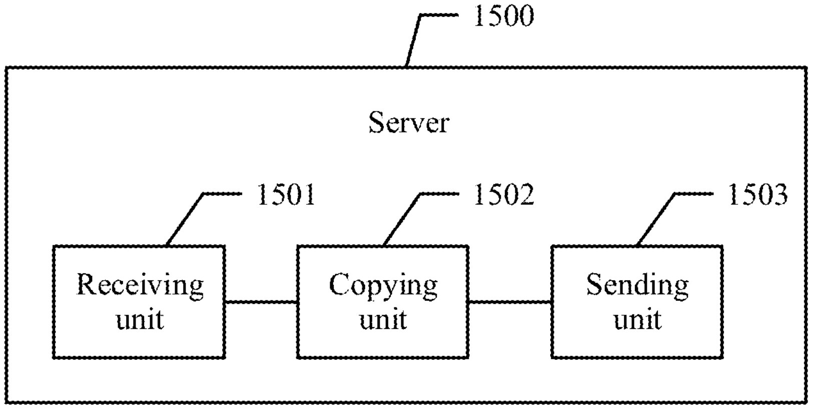
FIG. 15 is a diagram of another embodiment of a server according to an embodiment.

As shown in FIG. 15, another embodiment of a server 1500 provided in embodiments includes: a receiving unit 1501 configured to receive a memory access request from a sender, where the memory access request includes a sender virtual address and a receiver virtual address; a copying unit 1502 configured to copy access data corresponding to the receiver virtual address to a send buffer of a receiver, where a mapping relationship between a virtual address of the send buffer and a corresponding physical address is determined; and a sending unit 1503 configured to send a memory access message to a receive buffer of the sender via the send buffer, so that the sender copies access data in the receive buffer to the sender virtual address, where the memory access message includes the sender virtual address and the access data, a mapping relationship between a virtual address of the receive buffer and a corresponding physical address is determined, and the send buffer communicates with the receive buffer based on the physical address.

Optionally, a data size of the access data corresponding to the receiver virtual address is less than a preset threshold.

Figure 16:
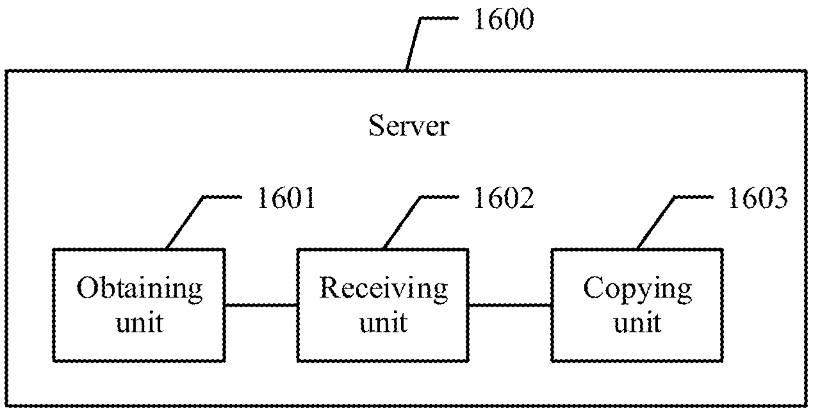
FIG. 16 is a diagram of another embodiment of a server according to an embodiment.

As shown in FIG. 16, another embodiment of a server 1600 provided in embodiments includes: an obtaining unit 1601 configured to generate a memory access request, where the memory access request includes a sender virtual address and a receiver virtual address; a sending unit configured to send the memory access request to a receiver, so that the receiver copies access data corresponding to the receiver virtual address to a send buffer of the receiver, where a mapping relationship between a virtual address of the send buffer and a corresponding physical address is determined; a receiving unit 1602 configured to receive, via a receive buffer, a memory access message sent by the receiver via the send buffer, where the memory access message includes the sender virtual address and the access data, a mapping relationship between a virtual address of the receive buffer and a corresponding physical address is determined, and the send buffer communicates with the receive buffer based on the physical address; and a copying unit 1603 configured to copy the access data in the receive buffer to the sender virtual address.

Optionally, the sending unit 1603 is further configured to: determine whether a data size of the access data corresponding to the receiver virtual address is greater than a preset threshold; and if no, send the memory access request to the receiver.

For specific implementations and beneficial effect of the server provided in embodiments, refer to corresponding parts in the foregoing method embodiments. Details are not described herein again.

Figure 17:
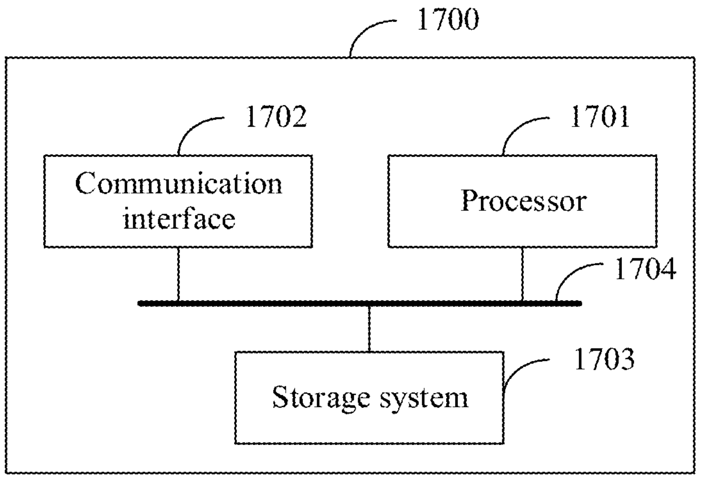
FIG. 17 is a diagram of an embodiment of a computer device according to an embodiment.

FIG. 17 is a diagram of a possible logical structure of a computer device 1700 according to an embodiment. The computer device 1700 includes a processor 1701, a communication interface 1702, a storage system 1703, and a bus 1704. The processor 1701, the communication interface 1702, and the storage system 1703 are connected to each other through the bus 1704. In embodiments, the processor 1701 is configured to control and manage an action of the computer device 1700, for example, the processor 1701 is configured to perform the memory access method described in some embodiments in FIG. 2 to FIG. 5. The communication interface 1702 is configured to support the computer device 1700 in communication. The storage system 1703 is configured to store program code and data of the computer device 1700.

The processor 1701 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this disclosure. Alternatively, the processor 1701 may be a combination of processors implementing a computing function, for example, a combination of one or more microprocessors, or a combination of the digital signal processor and a microprocessor. The bus 1704 may be a Peripheral Component Interconnect (PCI) bus, an Extended Industry Standard Architecture (EISA) bus, or the like. The bus may be classified into an address bus, a data bus, a control bus, or the like. For ease of representation, only one thick line is used to represent the bus in FIG. 17, but this does not mean that there is only one bus or only one type of bus.

In another embodiment, a computer-readable storage medium is further provided. The computer-readable storage medium stores computer-executable instructions. When at least one processor of a device executes the computer-executable instructions, the device performs the memory access method described in some embodiments in FIG. 2 to FIG. 5.

In another embodiment, a computer program product is further provided. The computer program product includes computer-executable instructions, and the computer-executable instructions are stored in a computer-readable storage medium. At least one processor of a device may read the computer-executable instructions from the computer-readable storage medium. The at least one processor executes the computer-executable instructions, so that the device performs the memory access method described in some embodiments in FIG. 2 to FIG. 5.

In another embodiment, a chip system is further provided. The chip system includes at least one processor and an interface. The interface is configured to receive data and/or a signal, and the at least one processor is configured to support implementation of the memory access method described in some embodiments in FIG. 2 to FIG. 5. In a possible design, the chip system may further include a storage. The storage is configured to store program instructions and data that may be necessary for a computer device. The chip system may include a chip, or may include a chip and another discrete device.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided, it should be understood that the disclosed system, apparatus, and method may be implemented in another manner. For example, the described apparatus embodiments are merely examples. For example, division into units is merely division into logical functions and may be other division during actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, or a network device) to perform all or some of the steps of the methods described in embodiments. The foregoing storage medium includes any medium that can store program code, for example, a USB flash drive, a removable hard disk, a read-only memory (ROM), a random-access memory (RAM), a magnetic disk, or an optical disc.

What is claimed is:

1. A method implemented by a receiver and comprising:
- receiving, from a sender, a memory access message comprising a sender virtual address of the sender and a receiver virtual address of the receiver;
- making a determination that the receiver virtual address is in a page fault state and that access data make up an entire page;
- allocating, after receiving the memory access message, and in response to the determination, a new page in a second memory of the receiver for writing the access data; and
- accessing a first memory of the sender based on a sender physical address of the sender, a receiver physical address of the receiver, a first mapping relationship mapping the sender virtual address to the sender physical address, and a second mapping relationship mapping the receiver virtual address to the receiver physical address.

2. The method of claim 1, wherein accessing the first memory comprises fetching data corresponding to the sender virtual address into the receiver virtual address.

3. The method of claim 1, wherein the access data correspond to the receiver virtual address, and wherein accessing the first memory comprises writing the access data into the sender virtual address.

4. The method of claim 1, further comprising unbinding, after accessing the first memory, the second mapping relationship.

5. The method of claim 4, further comprising sending, after accessing the first memory, an access complete message to the sender to prompt the sender to unbind the first mapping relationship.

6. The method of claim 1, further comprising determining the second mapping relationship.

7. The method of claim 6, further comprising further determining the second mapping relationship independently of components external to the receiver.

8. The method of claim 6, wherein determining the second mapping relationship comprises:

temporarily pinning the sender virtual address to the sender physical address; and configuring a virtual-physical address mapping table of a sender network interface card of the sender to allow a receiver network interface card of the receiver to read the sender virtual address and to prevent the sender virtual address from being swapped out when the receiver network interface card accesses the sender.

9. A method implemented by a sender and comprising:

obtaining a memory access message comprising a sender virtual address of the sender and a receiver virtual address of a receiver;

making a determination that a first data size of first access data corresponding to the sender virtual address or a second data size of second access data corresponding to the receiver virtual address is greater than a preset threshold;

determining, in response to the determination, a first mapping relationship mapping the sender virtual address to a sender physical address; and sending the memory access message to the receiver to prompt the receiver to access a memory of the sender based on the sender physical address of the sender, a receiver physical address of the receiver, the first mapping relationship, and a second mapping relationship mapping the receiver virtual address to the receiver physical address.

10. The method of claim 9, further comprising receiving, after sending the memory access message, an access complete message from the receiver.

11. The method of claim 10, further comprising unbinding the first mapping relationship in response to the access complete message.

12. The method of claim 9, further comprising avoiding, in response to the determination, copying the first access data to a send buffer of the sender.

13. A receiver comprising:

one or more processors configured to execute a program code to cause the receiver to:

receive, from a sender, a memory access message comprising a sender virtual address of the sender and a receiver virtual address of the receiver;

make a determination that the receiver virtual address is in a page fault state and that access data make up an entire page;

allocate, after receiving the memory access message, and in response to the determination, a new page in a second memory of the receiver for writing the access data; and access a first memory of the sender based on a sender physical address of the sender, a receiver physical address of the receiver, a first mapping relationship mapping the sender virtual address to the sender physical address, and a second mapping relationship mapping the receiver virtual address to the receiver physical address.

14. The receiver of claim 13, wherein the one or more processors are further configured to execute the program code to cause the receiver to access the first memory by fetching data corresponding to the sender virtual address into the receiver virtual address.

15. The receiver of claim 13, wherein the access data correspond to the receiver virtual address, and wherein the one or more processors are further configured to execute the program code to cause the receiver to further access the first memory by writing the access data into the sender virtual address.

16. The receiver of claim 13, wherein the one or more processors are further configured to execute the program code to cause the receiver to unbind, after accessing the first memory, the second mapping relationship.

17. The receiver of claim 16, wherein the one or more processors are further configured to execute the program code to cause the receiver to send, after accessing the first memory, an access complete message to the sender to prompt the sender to unbind the first mapping relationship.

18. The receiver of claim 13, wherein the one or more processors are further configured to execute the program code to cause the receiver to determine the second mapping relationship.

19. The receiver of claim 18, wherein the one or more processors are further configured to execute the program code to cause the receiver to further determine the second mapping relationship independently of components external to the receiver.

20. The receiver of claim 18, wherein the one or more processors are further configured to execute the program code to cause the receiver to further determine the second mapping relationship by:

temporarily pinning the sender virtual address to the sender physical address; and configuring a virtual-physical address mapping table of a sender network interface card of the sender to allow a receiver network interface card of the receiver to read the sender virtual address and to prevent the sender virtual address from being swapped out when the receiver network interface card accesses the sender.

* * * * *